(12) United States Patent
Shibata et al.

(10) Patent No.: US 12,209,179 B2
(45) Date of Patent: Jan. 28, 2025

(54) TRANSPARENT THERMOPLASTIC RESIN COMPOSITION, MOLDED ARTICLE OBTAINED THEREFROM, AND METHOD OF PRODUCING TRANSPARENT THERMOPLASTIC RESIN COMPOSITION

(71) Applicants: Toray Industries, Inc., Tokyo (JP); Toray Plastics (Malaysia) Sdn. Berhad, Penang (MY)

(72) Inventors: Takuya Shibata, Penang (MY); Akiyoshi Tamai, Ichihara (JP); Fahzimran Afinor Bin Afendi, Penang (MY)

(73) Assignees: Toray Industries, Inc., Tokyo (JP); Toray Plastics (Malaysia) Sdn. Berhad, Penang (MY)

( * ) Notice: Subject to any disclaimer, the term of this patent is extended or adjusted under 35 U.S.C. 154(b) by 0 days.

(21) Appl. No.: 18/693,080

(22) PCT Filed: Jun. 2, 2023

(86) PCT No.: PCT/MY2023/050045
§ 371 (c)(1),
(2) Date: Mar. 18, 2024

(87) PCT Pub. No.: WO2023/244101
PCT Pub. Date: Dec. 21, 2023

(65) Prior Publication Data
US 2024/0400814 A1    Dec. 5, 2024

(30) Foreign Application Priority Data

Jun. 14, 2022 (MY) .............................. PI2022003104

(51) Int. Cl.
| | | |
|---|---|---|
| C08L 33/12 | (2006.01) |
| C08F 220/14 | (2006.01) |
| C08F 279/06 | (2006.01) |
| C08J 3/20 | (2006.01) |
| C08K 5/103 | (2006.01) |

(52) U.S. Cl.
CPC ............ *C08L 33/12* (2013.01); *C08F 220/14* (2013.01); *C08F 279/06* (2013.01); *C08J 3/20* (2013.01); *C08K 5/103* (2013.01); *C08L 2201/10* (2013.01); *C08L 2205/02* (2013.01)

(58) Field of Classification Search
CPC .. C08L 33/12; C08L 2201/10; C08L 2205/02; C08F 220/14; C08F 279/06; C08J 3/20; C08K 5/103
USPC ......................................................... 524/504
See application file for complete search history.

(56) References Cited

U.S. PATENT DOCUMENTS

| | | | |
|---|---|---|---|
| 2016/0053050 A1* | 2/2016 | Tabor ..................... | C08G 18/73 525/445 |
| 2022/0259359 A1* | 8/2022 | Shibata ................. | C08F 220/14 |

FOREIGN PATENT DOCUMENTS

| | | |
|---|---|---|
| JP | 2003-292717 A | 10/2003 |
| JP | 2004-59858 A | 2/2004 |
| JP | 2011-236408 A | 11/2011 |
| JP | 2020-139054 A | 9/2020 |
| WO | 03/102076 A1 | 12/2003 |
| WO | 2021/014736 A1 | 1/2021 |

OTHER PUBLICATIONS

V.J. Parekh et al., "2.10.5.4.3 Enzymatic hydrolysis of castor oil", Engineering Fundamentals of Biotechnology, Comprehensive Biotechnology (Second Edition). (Year: 2011).*
International Search Report dated Aug. 29, 2023, of counterpart International Application No. PCT/MY2023/050045.

\* cited by examiner

*Primary Examiner* — Hannah J Pak
(74) *Attorney, Agent, or Firm* — DLA Piper LLP (US)

(57) ABSTRACT

A transparent thermoplastic resin composition includes: a graft copolymer (A) obtained by graft-copolymerizing a monomer mixture (a) that contains at least an aromatic vinyl monomer (a1) and a (meth)acrylic acid ester monomer (a2), in the presence of a rubbery polymer (r); a vinyl copolymer (B) obtained by copolymerizing a monomer mixture (b) that contains at least an aromatic vinyl monomer (b1), a (meth) acrylic acid ester monomer (b2) and a vinyl cyanide monomer (b3); an ester compound (C); and an ester compound (D).

9 Claims, 1 Drawing Sheet

TRANSPARENT THERMOPLASTIC RESIN COMPOSITION, MOLDED ARTICLE OBTAINED THEREFROM, AND METHOD OF PRODUCING TRANSPARENT THERMOPLASTIC RESIN COMPOSITION

TECHNICAL FIELD

This disclosure relates to a transparent thermoplastic resin composition and a molded article thereof.

BACKGROUND

Transparent ABS (Acrylonitrile Butadiene Styrene) resins containing a graft copolymer obtained by the copolymerization of a rubbery polymer such as a diene rubber with an aromatic vinyl compound such as styrene or α-methylstyrene, a vinyl cyanide compound such as acrylonitrile or methacrylonitrile, and an unsaturated carboxylic acid alkyl ester compound such as methyl methacrylate or methyl acrylate, are widely used in applications such as consumer electronics, communication-related equipment, general merchandise and medical equipment because they are excellent in transparency, balance between mechanical strengths such as impact resistance and rigidity, molding processability due to fluidity, cost performance and the like. Attempts to further improve the impact resistance and fluidity of such resins are continuing.

The following literature is known as one disclosing a resin composition containing hydrogenated castor oil. For example, WO 2003/102076 discloses a thermoplastic resin composition that includes a rubber-modified styrene resin composition containing: (I) 60 to 80% by mass of a continuous phase of a styrene-(meth)acrylic acid ester-based copolymer, which is a copolymer of a styrene monomer, a (meth)acrylic acid ester monomer, and a vinyl monomer copolymerizable with these monomers and used as necessary; and (II) 40 to 20% by mass of a dispersed phase of a graft copolymer obtained by grafting a styrene-(meth)acrylic acid ester-based copolymer, which is a copolymer of a styrene monomer, a (meth)acrylic acid ester monomer, and a vinyl monomer copolymerizable with these monomers and used as necessary, to a rubbery elastomer, wherein the dispersed phase has a volume average particle size of 0.3 to 0.6 μm, and satisfies a specific range calculated by a specific formula defining a relationship between the weight average molecular weight (Mw) of the continuous phase, amount of the (meth)acrylic acid ester monomer unit and amount of the styrene monomer unit. Further, the rubber-modified styrene resin composition contains 0.005 to 0.05 parts by mass of an organic polysiloxane with respect to 100 parts by mass of the resin composition, and 0.1 to 2.5 parts by mass of an ester-based lubricant with respect to 100 parts by mass of the rubber-modified styrene resin composition, wherein the ester-based lubricant is hydrogenated castor oil.

Further, the following is known as one disclosing a resin composition containing hydrogenated castor oil and a fatty acid ester. For example, JP 2020-139054 A proposes a transparent thermoplastic resin composition including a graft copolymer (A) obtained by graft-copolymerizing a monomer mixture (a) that contains at least an aromatic vinyl monomer (a1) and a (meth)acrylic acid ester monomer (a2), in the presence of a rubbery polymer (r); a vinyl copolymer (B) obtained by copolymerizing a monomer mixture (b) that contains at least an aromatic vinyl monomer (b1), a (meth) acrylic acid ester monomer (b2) and a vinyl cyanide monomer (b3); an ester wax (C), which is hydrogenated castor oil; and an ester wax (D), which is a fatty acid ester composed of a linear saturated monocarboxylic acid having 12 to 30 carbon atoms, and at least one alcohol selected from the group consisting of linear saturated monohydric alcohols having 14 to 30 carbon atoms and dihydric to hexahydric alcohols having 2 to 30 carbon atoms.

However, conventional thermoplastic resin compositions have been unable to achieve high levels of transparency, impact resistance and fluidity, and further improvements have been demanded.

It could therefore be helpful to provide: a transparent thermoplastic resin composition having all of the transparency, impact resistance and fluidity, that is, a transparent thermoplastic resin composition having both an excellent impact resistance and fluidity while maintaining a particularly high degree of transparency; and a molded article thereof.

SUMMARY

We found that a resin composition containing: a vinyl copolymer obtained by copolymerizing a vinyl monomer mixture; a rubbery polymer-containing graft copolymer; and two kinds of specific additives; can achieve both an excellent impact resistance and fluidity while maintaining a high degree of transparency.

We thus provide (1) to (9):

(1) A transparent thermoplastic resin composition, including:
  a graft copolymer (A) obtained by graft-copolymerizing a monomer mixture (a) that contains at least an aromatic vinyl monomer (a1) and a (meth)acrylic acid ester monomer (a2), in the presence of a rubbery polymer (r);
  a vinyl copolymer (B) obtained by copolymerizing a monomer mixture (b) that contains at least an aromatic vinyl monomer (b1), a (meth)acrylic acid ester monomer (b2) and a vinyl cyanide monomer (b3);
  the following ester compound (C); and
  the following ester compound (D);
  wherein the ester compound (C) is a hydrogenated product of a triglyceride of an acid(s) selected from the group consisting of palmitic acid, stearic acid, oleic acid, linoleic acid, ricinoleic acid and dihydroxystearic acid, and 85% by mass or more of the acid(s) constituting the triglyceride is a hydrogenated product of ricinoleic acid; and
  the ester compound (D) is an ester of an acid(s) selected from the group consisting of palmitic acid, stearic acid, oleic acid, linoleic acid, ricinoleic acid and dihydroxystearic acid, with a polyhydric alcohol (with the proviso that the ester contains at least one ester bond with an unsaturated carboxylic acid), and 85% by mass or more of the acid(s) constituting the ester is ricinoleic acid.

(2) The transparent thermoplastic resin composition according to (1), wherein the ester compound (D) has a hydroxyl value of 170 to 350 mg KOH/g.

(3) The transparent thermoplastic resin composition according to (1) or (2), wherein:
  the content of the ester compound (C) is 0.4 to 0.8 parts by mass with respect to 100 parts by mass of the total amount of the graft copolymer (A) and the vinyl copolymer (B);

the content of the ester compound (D) is 0.6 to 2.4 parts by mass with respect to 100 parts by mass of the total amount of the graft copolymer (A) and the vinyl copolymer (B); and the mass ratio ((C):(D)) of the ester compound (C) and the ester compound (D) is 25:75 to 40:60.

(4) The transparent thermoplastic resin composition according to any one of (1) to (3), wherein an acetone-soluble component contained in the transparent thermoplastic resin composition has a weight average molecular weight of 100,000 to 120,000.

(5) The transparent thermoplastic resin composition according to any one of (1) to (4), wherein, in the acetone-soluble component contained in the transparent thermoplastic resin composition, the content of a structural unit(s) derived from the (meth)acrylic acid ester monomer is 50 to 82% by mass, the content of a structural unit(s) derived from the aromatic vinyl monomer is 10 to 30% by mass, and the content of a structural unit(s) derived from the vinyl cyanide monomer is 8 to 15% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and a structural unit(s) derived from another vinyl monomer(s).

(6) The transparent thermoplastic resin composition according to any one of (1) to (5), wherein, when the weight average molecular weight of the acetone-soluble component contained in the transparent thermoplastic resin composition is defined as Mw1, and the content (% by mass) of the structural unit(s) derived from the vinyl cyanide monomer contained in the acetone-soluble component with respect to 100% by mass of the mass of the acetone-soluble component is defined as W1, the value obtained by dividing Mw1 by W1 is 11,000 or more.

(7) The transparent thermoplastic resin composition according to any one of (1) to (6), wherein the transparent thermoplastic resin composition further includes a polydimethylsiloxane gum (E).

(8) A method of producing a transparent thermoplastic resin composition, the method including the steps of:
obtaining a graft copolymer (A) by graft-copolymerizing a monomer mixture (a) that contains at least an aromatic vinyl monomer (a1) and a (meth)acrylic acid ester monomer (a2), in the presence of a rubbery polymer (r);
obtaining a vinyl copolymer (B) by copolymerizing a monomer mixture (b) that contains at least an aromatic vinyl monomer (b1), a (meth)acrylic acid ester monomer (b2) and a vinyl cyanide monomer (b3); and
mixing the graft copolymer (A), the vinyl copolymer (B), the following ester compound (C) and the following ester compound (D),
wherein the ester compound (C) is a hydrogenated product of a triglyceride of an acid(s) selected from the group consisting of palmitic acid, stearic acid, oleic acid, linoleic acid, ricinoleic acid and dihydroxystearic acid, and 85% by mass or more of the acid(s) constituting the triglyceride is hydrogenated ricinoleic acid; and
the ester compound (D) is an ester of an acid(s) selected from the group consisting of palmitic acid, stearic acid, oleic acid, linoleic acid, ricinoleic acid and dihydroxystearic acid, with a polyhydric alcohol (with the proviso that the ester contains at least one ester bond with an unsaturated carboxylic acid), and 85% by mass or more of the acid(s) constituting the ester is ricinoleic acid.

(9) A molded article formed using the transparent thermoplastic resin composition according to any one of (1) to (7).

(10) A molded article formed using a transparent thermoplastic resin composition produced by the method according to (8).

It is thus possible to obtain a transparent thermoplastic resin composition which has both an excellent impact resistance and fluidity while maintaining a particularly high degree of transparency.

Figure 1:
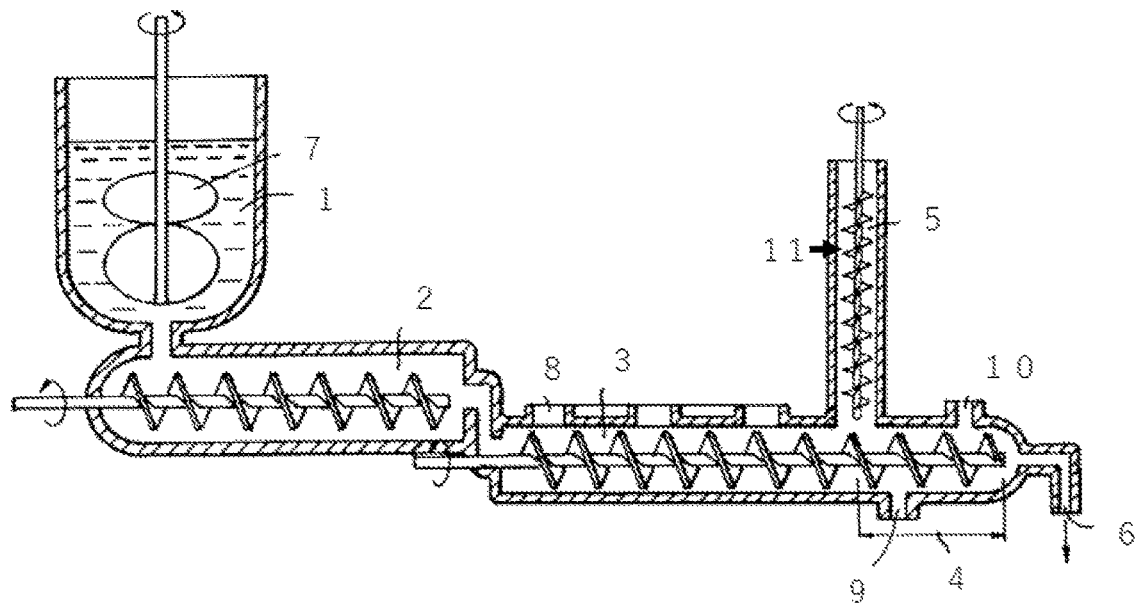
FIG. 1 is a schematic diagram showing one example of a production apparatus for producing a transparent thermoplastic resin composition.

REFERENCE SIGNS LIST 1 complete-mixing type polymerization tank
2 single-screw extruder type preheater
3 twin-screw extruder type demonomerization device
4 melt kneading region
5 twin-screw extruder type feeder
6 discharge port
7 stirrer (helical ribbon blade)
8 vent port
9 water injection port
10 final vent port
11 liquid-additive addition nozzle

DETAILED DESCRIPTION

Our compositions, articles and methods will now be described. However, the following description is one desirable example, and this disclosure is not limited to the contents of the description.

The term "(meth)acrylic acid" refers to both acrylic acid and methacrylic acid. For example, the definition of methyl (meth)acrylate includes both methyl acrylate and methyl methacrylate.

The transparent thermoplastic resin composition contains a graft copolymer (A), a vinyl copolymer (B) and two kinds of specific additives (an ester compound (C) and an ester compound (D)), which will be described later. The incorporation of the graft copolymer (A) enables to improve the formability of the transparent thermoplastic resin composition, and to improve the impact resistance and transparency of the resulting molded article. The incorporation of the vinyl copolymer (B) enables to improve the fluidity of the transparent thermoplastic resin composition, and to improve the transparency of the molded article. Further, the incorporation of two kinds of specific additives enables not only to improve the impact resistance of the molded article without causing a decrease in the transparency of the molded article, but also to improve the fluidity of the transparent thermoplastic resin composition to obtain a favorable formability.

Graft Copolymer (A)

The graft copolymer (A) included in the transparent thermoplastic resin composition is one obtained by graft-copolymerizing a monomer mixture (a) that contains at least an aromatic vinyl monomer (a1) and a (meth)acrylic acid ester monomer (a2), in the presence of a rubbery polymer (r). The monomer mixture (a) may further contain another monomer (a3) copolymerizable with the monomers (a1) and (a2).

Examples of the rubbery polymer (r) include polybutadiene, poly(butadiene-styrene) (SBR), poly(butadiene-acrylonitrile) (NBR), poly(butadiene-butyl acrylate), poly(butadiene-methyl methacrylate), poly(butyl acrylate-methyl methacrylate), poly(butadiene-ethyl acrylate) and natural rubber. These polymers may be used singly, or in combination of two or more kinds thereof. Among these, polybutadiene, SBR, NBR or natural rubber is preferred and polybutadiene is more preferred, from the viewpoint of further improving the impact resistance and the transparency of the resulting molded article.

The rubbery polymer (r) preferably has a mass average particle size of 0.15 to 0.4 μm, more preferably 0.20 to 0.35 μm, and still more preferably 0.25 to 0.35 μm. When the mass average particle size of the rubbery polymer (r) is less than 0.15 μm, the impact resistance of the molded article may decrease. When the mass average particle size of the rubbery polymer (r) is more than 0.4 μm, on the other hand, the transparency of the molded article may decrease.

The mass average particle size of the rubbery polymer (r) can be determined by: diluting a latex of the rubbery polymer (r) in a water medium to be dispersed therein; measuring the particle size distribution using a laser diffraction/scattering particle size distribution measuring apparatus (for example, "LS 13 320" (manufactured by Beckman Coulter Inc.)); and calculating the mass average particle size from the particle size distribution.

The content of the rubbery polymer (r) is preferably 20 to 80% by mass, with respect to 100% by mass of the total amount of the rubbery polymer (r) and the monomer mixture (a) constituting the graft copolymer (A). When the content of the rubbery polymer (r) is 20% by mass or more, the impact resistance and the transparency of the molded article can further be improved. The content of the rubbery polymer (r) is more preferably 35% by mass or more. Further, when the content of the rubbery polymer (r) is 80% by mass or less, the fluidity of the transparent thermoplastic resin composition, and the impact resistance of the molded article can further be improved. The content of the rubbery polymer (r) is more preferably 60% by mass or less.

Examples of the aromatic vinyl monomer (a1) include styrene monomers such as styrene, α-methylstyrene, p-methylstyrene, m-methylstyrene, o-methylstyrene, vinyltoluene and t-butylstyrene. These monomers may be used singly, or in combination of two or more kinds thereof. Among these, styrene is preferred from the viewpoint of further improving the fluidity of the transparent thermoplastic resin composition as well as the transparency and the rigidity of the molded article.

The content of the aromatic vinyl monomer (a1) in the monomer mixture (a) is preferably 5% by mass or more, more preferably 10% by mass or more, and still more preferably 20% by mass or more with respect to 100% by mass of the mass of the monomer mixture (a), from the viewpoint of further improving the fluidity of the transparent thermoplastic resin composition as well as the transparency and the rigidity of the molded article. On the other hand, the content of the aromatic vinyl monomer (a1) in the monomer mixture (a) is preferably 40% by mass or less, more preferably 35% by mass or less, and still more preferably 30% by mass or less, from the viewpoint of improving the impact resistance and the transparency of the molded article. When the content of the aromatic vinyl monomer (a1) is within the range described above, it is possible to easily produce a transparent thermoplastic resin composition in which the content of the structural unit(s) derived from the aromatic vinyl monomer is 10 to 30% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

The (meth)acrylic acid ester monomer (a2) in the monomer mixture (a) is preferably, for example, an ester of an alcohol having 1 to 6 carbon atoms and acrylic acid or methacrylic acid. The ester of an alcohol having 1 to 6 carbon atoms and acrylic acid or methacrylic acid may further contain a substituent such as a hydroxyl group or a halogen group. Examples of the ester of an alcohol having 1 to 6 carbon atoms and acrylic acid or methacrylic acid include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate and 2,3,4,5-tetrahydroxypentyl (meth)acrylate. These esters may be used singly, or in combination of two or more kinds thereof. Among these, methyl (meth)acrylate is preferred from the viewpoint of improving the transparency of the molded article.

The content of the (meth)acrylic acid ester monomer (a2) in the monomer mixture (a) is preferably 30% by mass or more, more preferably 50% by mass or more, and still more preferably 60% by mass or more in 100% by mass of the total amount of the monomer mixture (a), from the viewpoint of improving the transparency of the molded article. On the other hand, the content of the (meth)acrylic acid ester monomer (a2) in the monomer mixture (a) is preferably 82% by mass or less, more preferably 80% by mass or less, and still more preferably 75% by mass or less in 100% by mass of the total amount of the monomer mixture (a), from the viewpoint of improving the transparency of the molded article. When the content of the (meth)acrylic acid ester monomer (a2) is within the range described above, it is possible to easily produce a transparent thermoplastic resin composition in which the content of the structural unit(s) derived from the (meth)acrylic acid ester monomer is 50 to 82% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

The other monomer (a3) copolymerizable with the aromatic vinyl monomer (a1) and the (meth)acrylic acid ester monomer (a2) is not particularly limited, as long as it is a vinyl monomer which is other than the aromatic vinyl monomer (a1) and the (meth)acrylic acid ester monomer (a2) described above, and which does not impair the desired effects.

The other monomer (a3) may specifically be, for example, a vinyl cyanide monomer, an unsaturated fatty acid, an acrylamide monomer or a maleimide monomer. These monomers may be used singly, or in combination of two or more kinds thereof.

Examples of the vinyl cyanide monomer include acrylonitrile, methacrylonitrile and ethacrylonitrile. These monomers may be used singly, or in combination of two or more kinds thereof. Among these, acrylonitrile is preferred from the viewpoint of further improving the impact resistance of the molded article.

Examples of the unsaturated fatty acid include itaconic acid, maleic acid, fumaric acid, butenoic acid, acrylic acid and methacrylic acid.

Examples of the acrylamide monomer include acrylamide, methacrylamide and N-methylacrylamide.

Examples of the maleimide monomer include N-methylmaleimide, N-ethylmaleimide, N-isopropylmaleimide, N-butylmaleimide, N-hexylmaleimide, N-octyl maleimide, N-dodecylmaleimide, N-cyclohexylmaleimide and N-phenylmaleimide.

The content of the other monomer (a3) in the monomer mixture (a) is preferably 2% by mass or more with respect to 100% by mass of the mass of the monomer mixture (a), from the viewpoint of improving the impact resistance of the molded article. From the viewpoint of improving the color of the molded article, on the other hand, the content of the other monomer (a3) is preferably 30% by mass or less, more preferably 20% by mass or less, and still more preferably 5% by mass or less.

As the other monomer (a3), a vinyl cyanide monomer can be preferably used. The content of the vinyl cyanide monomer in the monomer mixture (a) is preferably 2% by mass or more with respect to 100% by mass of the mass of the monomer mixture (a). From the viewpoint of improving the color of the molded article, on the other hand, the content of the vinyl cyanide monomer is preferably 30% by mass or less, and more preferably 20% by mass or less, and still more preferably 5% by mass or less. When the content of the vinyl cyanide monomer is within the range described above, it is possible to easily produce a transparent thermoplastic resin composition in which the content of the structural unit(s) derived from the vinyl cyanide monomer is 8 to 15% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

A portion of the graft copolymer (A) can be soluble in acetone. The acetone-soluble component preferably has a weight average molecular weight of 50,000 or more, and more preferably 60,000 or more, but not particularly limited thereto. When the weight average molecular weight of the acetone-soluble component of the graft copolymer (A) is 50,000 or more, the impact resistance of the molded article can further be improved. On the other hand, the weight average molecular weight of the acetone-soluble component of the graft copolymer (A) is preferably 100,000 or less, and more preferably 90,000 or less. When the weight average molecular weight of the acetone-soluble component of the graft copolymer (A) is 100,000 or less, the fluidity of the transparent thermoplastic resin composition can further be improved. Moreover, when the weight average molecular weight of the acetone-soluble component is 50,000 to 100,000, it is possible to easily produce a transparent thermoplastic resin composition in which the weight average molecular weight of the acetone-soluble component in the transparent thermoplastic resin composition to be described later, is 100,000 to 120,000.

The "weight average molecular weight" refers to the molecular weight in terms of polymethyl methacrylate. To eliminate the influence of low-molecular weight components, the weight average molecular weight is defined as the value obtained for components whose molecular weight is 3,000 or more.

To measure the weight average molecular weight of the acetone-soluble component of the graft copolymer (A), the graft copolymer (A) is introduced into acetone to dissolve the soluble component, and the filtrate obtained by filtering the acetone-insoluble component from the graft copolymer (A) is concentrated by a rotatory evaporator, to collect the acetone-soluble component. About 0.03 g of the collected acetone-soluble component is dissolved in about 15 g of tetrahydrofuran, to prepare a solution of about 0.2% by mass. The weight average molecular weight of the acetone-soluble component can be determined by calculating in terms of polymethyl methacrylate as a reference material, from the GPC chromatogram obtained by measurement using the thus prepared solution. The GPC measurement can be performed under the following conditions:

Measuring apparatus: Waters 2695
Column temperature: 40° C.
Detector: RI 2414 (differential refractometer)
Carrier eluent flow rate: 0.3 ml/min (solvent: tetrahydrofuran)
Columns: TSkgel Super HZM-M (6.0 mm I. D.×15 cm), TSkgel Super HZM-N (6.0 mm I. D.×15 cm), arranged in tandem (both manufactured by Tosoh Corporation).

The graft ratio of the graft copolymer (A) is not particularly limited, but preferably 10 to 100% from the viewpoint of improving the impact resistance of the molded article.

The graft ratio of the graft copolymer (A) can be determined by the following method. First, 80 ml of acetone is added to about 1 g (m: sample mass) of the graft copolymer (A), and the mixture is refluxed in a hot water bath at 70° C. for 3 hours. After centrifuging the resulting solution at 8,000 r.p.m (10,000 G) for 40 minutes, the insoluble component is filtered to obtain the acetone-insoluble component. The resulting acetone-insoluble component is dried at 80° C. for 5 hours under reduced pressure, the mass (n) thereof is measured, and the graft ratio is calculated by the following equation. In the following equation, X represents the content (%) of the rubbery polymer in the graft copolymer (A).

$$\text{Graft ratio (\%)} = \{[(n) - ((m) \times X / 100)] / [(m) \times X / 100]\} \times 100$$

The difference in refractive index between the graft component (acetone-insoluble component) of the graft copolymer (A) and the rubbery polymer (r) is preferably 0.03 or less, and more preferably 0.01 or less. The transparency of the molded article can be improved by reducing the difference in refractive index between the graft component (acetone-insoluble component) of the graft copolymer (A) and the rubbery polymer (r) to 0.03 or less.

Since the refractive index of the graft component of the graft copolymer (A) varies mainly depending on the composition of the vinyl monomers which is one of component of raw materials, the refractive index can be controlled within a desired range by selecting as appropriate the type and the composition ratio of the vinyl monomers. Particularly, when the rate of conversion to a high molecular weight form is adjusted to 95% or more by the emulsion polymerization method, the composition of the graft component will be roughly the same as the composition of the vinyl monomer mixture (a).

The refractive index of the graft component of the graft copolymer (A) can be estimated from the refractive indices and the contents of the vinyl monomers. In a copolymer of styrene, methyl methacrylate and acrylonitrile, for example, the refractive index of the graft component of the graft copolymer (A) can be estimated by the following equation:

$$nD(G) = (1.595 \times MS/100) + (1.490 \times MM/100) + (1.510 \times MA/100)$$

In the equation, nD(G) represents the refractive index of the graft component of the graft copolymer (A), MS represents the content (% by mass) of styrene, MM represents the content (% by mass) of methyl methacrylate, and MA represents the content (% by mass) of acrylonitrile. 1.595 represents the refractive index of polystyrene, 1.490 represents the refractive index of polymethyl methacrylate, 1.510 represents the refractive index of polyacrylonitrile. The refractive indices of polystyrene, polymethyl methacrylate and polyacrylonitrile can be measured by an Abbe refractometer.

The graft copolymer (A) is more preferably produced by the emulsion polymerization method since the mass average particle size of the rubbery polymer (r) can be easily adjusted to a desired range, and the polymerization stability can be easily controlled by removing heat during the polymerization.

When producing the graft copolymer (A) by the emulsion polymerization method, the method of introducing the rubbery polymer (r) and the monomer mixture (a) is not particularly limited. For example, all of these may be initially introduced at once. Alternatively, to control the distribution of the copolymer composition, a part of the monomer mixture (a) may be introduced continuously, or a part or the entirety of the monomer mixture (a) may be introduced in divided portions. The expression "to introduce apart of the monomer mixture (a) continuously" means that a part of the monomer mixture (a) is initially introduced, and the remaining portion of the mixture is introduced continuously over time. Further, the expression "to introduce a part or the entirety of the monomer mixture (a) in divided portions" means that a part or the entirety of the monomer mixture (a) is introduced at a timepoint(s) after the initial introduction.

When producing the graft copolymer (A) by the emulsion polymerization method, any of various surfactants may be added as an emulsifier. An anionic surfactant such as one in the form of a carboxylic acid salt, a sulfuric acid ester salt or a sulfonic acid salt is particularly preferably used as such a surfactant. These surfactants may be used singly, or in combination of two or more kinds thereof. Examples of the "salt" include: alkali metal salts such as sodium salts, lithium salts and potassium salts; and ammonium salts.

Examples of the emulsifier in the form of a carboxylic acid salt include caprylates, caprates, laurylates, myristates, palmitates, stearates, oleates, linoleates, linolenates, rosinates and behenates, dialkyl sulfosuccinates.

Examples of the emulsifier in the form of a sulfuric acid ester salt include sulfuric acid ester salts of castor oil, sulfuric acid ester salts of lauryl alcohol, polyoxyethylene lauryl sulfate, polyoxyethylene alkyl ether sulfates and polyoxyethylene alkyl phenyl ether sulfates.

Examples of the emulsifier in the form of a sulfonic acid salt include dodecylbenzene sulfonate, alkyl naphthalene sulfonates, alkyl diphenyl ether disulfonates and naphthalene sulfonate condensates.

When producing the graft copolymer (A) by the emulsion polymerization method, an initiator may be added as necessary. The initiator may be, for example, a peroxide, an azo-based compound or a water-soluble potassium persulfate. These initiators may be used singly, or in combination of two or more kinds thereof. A redox polymerization initiator may also be used as the initiator.

Examples of the peroxide include benzoyl peroxide, cumene hydroperoxide, dicumyl peroxide, diisopropylbenzene hydroperoxide, t-butyl hydroperoxide, t-butyl peroxyacetate, t-butyl peroxybenzoate, t-butyl isopropyl carbonate, di-t-butyl peroxide, t-butyl peroxyoctate, 1,1-bis(t-butylperoxy)3,3,5-trimethylcyclohexane, 1,1-bis(t-butylperoxy)cyclohexane and t-butyl peroxy-2-ethylhexanoate. Among these, cumene hydroperoxide, 1,1-bis(t-butylperoxy)3,3,5-trimethylcyclohexane or 1,1-bis(t-butylperoxy)cyclohexane is particularly preferably used.

Examples of the azo-based compound include azobisdimethylvaleronitrile, azobis(2,4-dimethyl)valeronitrile, 2-phenylazo-2,4-dimethyl-4-methoxyvaleronitrile, 2-cyano-2-propylazoformamide, 1,1'-azobiscyclohexane-1-carbonitrile, azobis (4-methoxy-2,4-dimethyl)valeronitrile, dimethyl 2,2'-azobisisobutyrate, 1-t-butylazo-2-cyanobutane and 2-t-butylazo-2-cyano-4-methoxy-4-methylpentane. Among these, 1,1'-azobiscyclohexane-1-carbonitrile is particularly preferably used.

The amount of the initiator to be added for producing the graft copolymer (A) is not particularly limited. However, the added amount of the initiator is preferably 0.1 to 0.5 parts by mass with respect to 100 parts by mass of the total amount of the rubbery polymer (r) and the monomer mixture (a), from the viewpoint of the productivity of the graft copolymer (A).

When producing the graft copolymer (A) by the emulsion polymerization method, a chain transfer agent may be used. The use of a chain transfer agent enables to easily control the graft ratio of the graft copolymer (A) to a desired range. Examples of the chain transfer agent include: mercaptans such as n-octyl mercaptan, t-dodecyl mercaptan, n-dodecyl mercaptan, n-tetradecyl mercaptan and n-octadecyl mercaptan; and terpenes such as terpinolene. These chain transfer agents may be used singly, or in combination of two or more kinds thereof. Among these, n-octyl mercaptan and t-dodecyl mercaptan are preferably used.

The amount of the chain transfer agent to be added for producing the graft copolymer (A) is not particularly limited. However, the added amount of the chain transfer agent is preferably 0.2 to 0.7 parts by mass with respect to 100 parts by mass of the total amount of the rubbery polymer (r) and the monomer mixture (a) because the graft ratio of the graft copolymer (A) can be more easily controlled. The lower limit of the added amount is more preferably 0.4 parts by mass or more, and the upper limit thereof is more preferably 0.6 parts by mass or less.

When producing the graft copolymer (A) by the emulsion polymerization method, the polymerization temperature is not particularly limited. However, the polymerization temperature is preferably 40 to 70° C. from the viewpoint of emulsification stability.

When producing the graft copolymer (A) by the emulsion polymerization method, it is common to add a coagulant to a latex of the graft copolymer to collect the graft copolymer (A). An acid or a water-soluble salt is preferably used as the coagulant.

Examples of the acid include sulfuric acid, hydrochloric acid, phosphoric acid and acetic acid. Examples of the water-soluble salt include calcium chloride, magnesium chloride, barium chloride, aluminum chloride, magnesium sulfate, aluminum sulfate, ammonium aluminum sulphate, potassium aluminum sulfate and sodium aluminum sulfate. These may be used singly, or in combination of two or more kinds thereof. From the viewpoint of improving the color of the molded article, it is preferred to prevent the emulsifier from remaining in the thermoplastic resin composition, and to use an alkali fatty acid salt as the emulsifier to cause an acid coagulation. In this example, it is preferred to subsequently remove the emulsifier by neutralization with an alkali such as sodium hydroxide.

Vinyl Copolymer (B)

The vinyl copolymer (B) included in the transparent thermoplastic resin composition is one obtained by copolymerizing a monomer mixture (b) that contains at least an aromatic vinyl monomer (b1), a (meth)acrylic acid ester monomer (b2) and a vinyl cyanide monomer (b3). The monomer mixture (b) may further contain another monomer (b4) copolymerizable with the monomers (b1) to (b3).

Examples of the aromatic vinyl monomer (b1) include those exemplified in the section of the aromatic vinyl monomer (a1). Of these, styrene is preferred.

The content of the aromatic vinyl monomer (b1) in the monomer mixture (b) is preferably 10% by mass or more, more preferably 15% by mass or more, and still more preferably 20% by mass or more with respect to 100% by mass of the mass of the monomer mixture (b), from the viewpoint of further improving the fluidity of the transparent thermoplastic resin composition as well as the transparency and the rigidity of the resulting molded article. Further, the content of the aromatic vinyl monomer (b1) in the monomer mixture (b) is preferably 30% by mass or less, more preferably 27% by mass or less, and still more preferably 25% by mass or less, from the viewpoint of improving the impact resistance and the transparency of the molded article. When the content of the aromatic vinyl monomer (b1) is within the range described above, it is possible to easily produce a transparent thermoplastic resin composition in which the content of the structural unit(s) derived from the aromatic vinyl monomer is 10 to 30% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

Examples of the (meth)acrylic acid ester monomer (b2) include those exemplified in the section of the (meth)acrylic acid ester monomer (a2), and it is preferred to use methyl (meth)acrylate.

The content of the (meth)acrylic acid ester monomer (b2) in the monomer mixture (b) is preferably 50% by mass or more, more preferably 55% by mass or more, and still more preferably 60% by mass or more with respect to 100% by mass of the mass of the monomer mixture (b), from the viewpoint of improving the transparency of the molded article. Further, the content of the (meth)acrylic acid ester monomer (b2) in the monomer mixture (b) is preferably 82% by mass or less, more preferably 80% by mass or less, and still more preferably 75% by mass or less, from the viewpoint of further improving the transparency of the molded article. When the content of the (meth)acrylic acid ester monomer (b2) is within the range described above, it is possible to easily produce a transparent thermoplastic resin composition in which the content of the structural unit(s) derived from the (meth)acrylic acid ester monomer is 50 to 82% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

Examples of the vinyl cyanide monomer (b3) include acrylonitrile, methacrylonitrile and ethacrylonitrile. These monomers may be used singly, or in combination of two or more kinds thereof. Among these, acrylonitrile is preferred from the viewpoint of further improving the impact resistance of the molded article.

The content of the vinyl cyanide monomer (b3) in the monomer mixture (b) is preferably 4% by mass or more, more preferably 8% by mass or more, and still more preferably 9% by mass or more with respect to 100% by mass of the mass of the monomer mixture (b), from the viewpoint of further improving the impact resistance of the molded article. Further, the content of the vinyl cyanide monomer (b3) in the monomer mixture (b) is preferably 15% by mass or less, more preferably 13% by mass or less, and still more preferably 12% by mass or less, from the viewpoint of improving the color of the molded article. In particular, when the content of the vinyl cyanide monomer (b3) is 8 to 15% by mass, it is possible to easily produce a transparent thermoplastic resin composition in which the content of the structural unit(s) derived from the vinyl cyanide monomer is 8 to 15% by mass, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), which are contained in the acetone-soluble component in the transparent thermoplastic resin composition to be described later.

The other monomer (b4) copolymerizable with these monomers is not particularly limited, as long as it is a vinyl monomer other than the aromatic vinyl monomer (b1), the (meth)acrylic acid ester monomer (b2) and the vinyl cyanide monomer (b3) described above, copolymerizable with these monomers, and does not impair the desired effects.

The other monomer (b4) may specifically be, for example, an unsaturated fatty acid, an acrylamide monomer or a maleimide monomer. These monomers may be used singly, or in combination of two or more kinds thereof.

Examples of the unsaturated fatty acid include itaconic acid, maleic acid, fumaric acid, butenoic acid, acrylic acid and methacrylic acid.

Examples of the acrylamide monomer include acrylamide, methacrylamide and N-methylacrylamide.

Examples of the maleimide monomer include N-methylmaleimide, N-ethylmaleimide, N-isopropylmaleimide, N-butylmaleimide, N-hexylmaleimide, N-octyl maleimide, N-dodecylmaleimide, N-cyclohexylmaleimide and N-phenylmaleimide.

The content of the other monomer (b4) in the monomer mixture (b) is preferably 20% by mass or less, and more preferably 10% by mass or less with respect to 100% by mass of the mass of the monomer mixture (b), from the viewpoint of improving the fluidity of the transparent thermoplastic resin composition as well as the impact resistance and the transparency of the molded article.

The vinyl copolymer (B) preferably has a weight average molecular weight of 100,000 or more, and more preferably 110,000 or more. When the weight average molecular weight of the vinyl copolymer (B) is adjusted to 100,000 or more, the impact resistance of the molded article can further be improved. Further, the weight average molecular weight of the vinyl copolymer (B) is preferably 130,000 or less, and more preferably 120,000 or less. When the weight average molecular weight of the vinyl copolymer (B) is adjusted to 130,000 or less, the fluidity of the transparent thermoplastic resin composition can further be improved. Moreover, when the weight average molecular weight of the vinyl copolymer (B) is 100,000 to 130,000, it is possible to easily produce a transparent thermoplastic resin composition in which the weight average molecular weight of the acetone-soluble component in the transparent thermoplastic resin composition to be described later is 100,000 to 120,000.

To eliminate the influence of low-molecular weight components, the weight average molecular weight refers to the value obtained for the components whose molecular weight in terms of polymethyl methacrylate is 3,000 or more.

The weight average molecular weight of the vinyl copolymer (B) can be determined by calculating in terms of polymethyl methacrylate as a reference material, from the GPC chromatogram obtained by measurement using a 0.2% by mass solution in which about 0.03 g of the vinyl copolymer (B) is dissolved in about 15 g of tetrahydrofuran. The GPC measurement can be performed under the following conditions:

Measuring apparatus: Waters 2695
Column temperature: 40° C.
Detector: RI 2414 (differential refractometer)
Carrier eluent flow rate: 0.3 ml/min (solvent: tetrahydrofuran)
Columns: TSkgel Super HZM-M (6.0 mm I. D.×15 cm), TSkgel Super HZM-N (6.0 mm I. D.×15 cm), arranged in tandem (both manufactured by Tosoh Corporation).

The difference between the refractive index of the vinyl copolymer (B), and the refractive index of the rubbery polymer (r) contained in the graft copolymer (A) described above, is preferably 0.03 or less, and more preferably 0.01 or less. The transparency of the molded article can be improved by reducing the difference between the refractive index of the vinyl copolymer (B) and the refractive index of the rubbery polymer (r) to 0.03 or less.

Since the refractive index of the vinyl copolymer (B) varies depending on the composition of the vinyl monomers as the main raw materials, the refractive index can be controlled within a desired range by selecting as appropriate the type and the composition ratio of the vinyl monomers. The refractive index of the vinyl copolymer (B) can be estimated from the refractive indices and the contents of the vinyl monomers. In a copolymer of styrene, methyl methacrylate and acrylonitrile, for example, the refractive index of the vinyl copolymer (B) can be estimated by the following equation:

$$nD(B) = (1.595 \times MS/100) + (1.490 \times MM/100) + (1.510 \times MA/100)$$

In the equation, nD(B) represents the refractive index of the vinyl copolymer (B), MS represents the content (% by mass) of styrene, MM represents the content (% by mass) of methyl methacrylate, and MA represents the content (% by mass) of acrylonitrile. 1.595 represents the refractive index of polystyrene, 1.490 represents the refractive index of polymethyl methacrylate, 1.510 represents the refractive index of polyacrylonitrile. The refractive indices of polystyrene, polymethyl methacrylate and polyacrylonitrile can each be measured by an Abbe refractometer.

The refractive index of the vinyl copolymer (B) can also be measured by an Abbe refractometer.

The method of producing the vinyl copolymer (B) is not particularly limited. However, the continuous bulk polymerization method or the continuous solution polymerization method is preferably used, from the viewpoint of improving the fluidity of the resulting transparent thermoplastic resin composition as well as the transparency and the color of the resulting molded article.

To produce the vinyl copolymer (B) by the continuous bulk polymerization method or the continuous solution polymerization method, an arbitrary conventionally known method can be used such as, for example, a method in which the monomer mixture (b) is polymerized in a polymerization tank, followed by demonomerization (desolventization/devolatilization).

As the polymerization tank, it is possible to use, for example, a mixing type polymerization tank with a stirring blade such as a paddle blade, a turbine blade, a propeller blade, a Bull-margin blade, a multi-stage blade, an anchor blade, a Max Blend blade or a double helical blade, any of various types of tower type reactors or the like. Further, a multi-tube reactor, a kneader reactor, a twin-screw extruder or the like can also be used as a polymerization reactor (see, for example, Assessment of Polymer Production Process 10 "Assessment of Impact Resistant Polystyrene", the Society of Polymer Science, Japan, published on Jan. 26, 1989).

Two or more of these polymerization tanks or polymerization reactors may be used, or alternatively, two or more kinds of polymerization tanks or polymerization reactors may be used in combination, as necessary. From the viewpoint of reducing the degree of dispersion of the vinyl copolymer (B), it is preferred to use not more than two polymerization tanks or polymerization reactors, and more preferably, a single-tank, complete-mixing type polymerization tank.

Usually, the reaction mixture obtained by polymerization using any of these polymerization tanks or polymerization reactors is then subjected to a demonomerization step to remove the monomers and the solvent as well as other volatile components. Examples of the demonomerization method include: a method of removing volatile components through a vent hole, while heating in a single-screw or twin-screw extruder with a vent under normal pressure or reduced pressure; a method of removing volatile components using an evaporator incorporating a plate fin heater within the drum such as a centrifugal evaporator; a method removing volatile components using a thin film evaporator such as a centrifugal thin film evaporator; and a method of removing volatile components by preheating using a multi-tubular heat exchanger, foaming, and flashing into a vacuum tank. Among these, a method of removing volatile components using a single-screw or twin-screw extruder with a vent is particularly preferably used.

When producing the vinyl copolymer (B), an initiator and/or a chain transfer agent may be used as necessary. Examples of the initiator and the chain transfer agent include initiators and chain transfer agents exemplified in the method of producing the graft copolymer (A). A redox initiator is also used as the initiator.

The amount of the initiator to be added for producing the vinyl copolymer (B) is not particularly limited. However, the added amount of the initiator is preferably 0.01 to 0.10 parts by mass with respect to 100 parts by mass of the total amount of the vinyl monomer mixture (b) because the weight average molecular of the vinyl copolymer (B) can be more easily adjusted to the range described above.

The amount of the chain transfer agent to be added for producing the vinyl copolymer (B) is not particularly limited. However, the added amount of the chain transfer agent is preferably 0.10 to 0.40 parts by mass with respect to 100 parts by mass of the total amount of the vinyl monomer mixture (b) because the weight average molecular of the vinyl copolymer (B) can be more easily adjusted to the range described above. The lower limit of the added amount is more preferably 0.20 parts by mass or more, and the upper limit thereof is more preferably 0.30 parts by mass or less.

When producing the vinyl copolymer (B) by the continuous bulk polymerization method or the continuous solution polymerization method, the polymerization temperature is not particularly limited. However, the polymerization temperature is preferably 120° C. to 140° C. because the weight average molecular of the vinyl copolymer (B) can be more easily adjusted to the range described above.

When producing the vinyl copolymer (B) by the continuous solution polymerization method, the amount of solvent is preferably 30% by mass or less, and more preferably 20% by mass or less in the polymerization solution, from the viewpoint of the productivity. The solvent to be used is preferably ethylbenzene or methyl ethyl ketone, and more preferably ethylbenzene, from the viewpoint of the polymerization stability.

Transparent Thermoplastic Resin Composition

The transparent thermoplastic resin composition preferably contains 10 to 60 parts by mass of the graft copolymer (A) and 40 to 90 parts by mass of the vinyl copolymer (B), with respect to 100 parts by mass of the total amount of the graft copolymer (A) and the vinyl copolymer (B). On the other hand, when the content of the graft copolymer (A) is less than 10 parts by mass, and the content of the vinyl copolymer (B) is more than 90 parts by mass, the impact resistance of the resulting molded article may decrease. The transparent thermoplastic resin composition more preferably contains 20 parts by mass or more of the graft copolymer (A) and 80 parts by mass or less of the vinyl copolymer (B), with respect to 100 parts by mass of the total amount of the graft copolymer (A) and the vinyl copolymer (B). When the content of the graft copolymer (A) is more than 60 parts by mass and the content of the vinyl copolymer (B) is less than 40 parts by mass, on the other hand, the melt viscosity of the transparent thermoplastic resin composition may increase to cause a decrease in the fluidity, possibly resulting in a decrease in the transparency of the resulting molded article, as well. The transparent thermoplastic resin composition more preferably contains 50 parts by mass or less of the graft copolymer (A) and 50 parts by mass or more of the vinyl copolymer (B), with respect to 100 parts by mass of the total amount of the graft copolymer (A) and the vinyl copolymer (B).

The acetone-soluble component contained in the transparent thermoplastic resin composition preferably has a weight average molecular weight of 100,000 to 120,000. When the weight average molecular weight of the acetone-soluble component contained in the transparent thermoplastic resin composition is adjusted to 100,000 or more, the impact resistance of the molded article can further be improved. Further, when the weight average molecular weight of the acetone-soluble component contained in the transparent thermoplastic resin composition is adjusted to 120,000 or less, the fluidity of the transparent thermoplastic resin composition can further be improved.

The weight average molecular weight of the acetone-soluble component contained in the transparent thermoplastic resin composition can be measured according to the same procedure as that described in the section of the graft copolymer (A), after introducing and the transparent thermoplastic resin composition into acetone to dissolve the soluble component.

In the acetone-soluble component contained in the transparent thermoplastic resin composition, the content of the structural unit(s) derived from the (meth)acrylic acid ester monomer is preferably 50% by mass or more, more preferably 55% by mass or more, and still more preferably 60% by mass or more, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), from the viewpoint of improving the transparency of the molded article. From the viewpoint of further improving the transparency of the molded article, on the other hand, the content of the structural unit(s) derived from the (meth)acrylic acid ester monomer is preferably 82% by mass or less, more preferably 80% by mass or less, and still more preferably 75% by mass or less.

In the acetone-soluble component contained in the transparent thermoplastic resin composition, the content of the structural unit(s) derived from the aromatic vinyl monomer is preferably 10% by mass or more, more preferably 15% by mass or more, and still more preferably 20% by mass or more, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), from the viewpoint of further improving the fluidity of the transparent thermoplastic resin composition as well as the transparency and the rigidity of the molded article. From the viewpoint of further improving the impact resistance and the transparency of the molded article, on the other hand, the content of the structural unit(s) derived from the aromatic vinyl monomer is preferably 30% by mass or less, more preferably 27% by mass or less, and still more preferably 25% by mass or less.

In the acetone-soluble component contained in the transparent thermoplastic resin composition, the content of the structural unit(s) derived from the vinyl cyanide monomer is preferably 8% by mass or more, and more preferably 9% by mass or more, with respect to 100% by mass of the total amount of the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), from the viewpoint of further improving the impact resistance of the molded article. From the viewpoint of further improving the color of the molded article, on the other hand, the content of the structural unit(s) derived from the vinyl cyanide monomer is preferably 15% by mass or less, more preferably 13% by mass or less, and still more preferably 11% by mass or less.

As a polymer is formed by the polymerization of a number of monomers, the term "structural unit" refers to a repeating unit representing, or corresponding to, each monomer used in the structural formula of the polymer. For example, the structural unit derived from styrene, in polystyrene, is [—$CH_2$—$CH(C_6H_5)$—].

The content of the rubbery polymer (r) contained in the transparent thermoplastic resin composition is preferably 12 to 22% by mass, with respect to 100% by mass of the total amount of the rubbery polymer (r), the structural unit(s) derived from the (meth)acrylic acid ester monomer, the structural unit(s) derived from the aromatic vinyl monomer, the structural unit(s) derived from the vinyl cyanide monomer and the structural unit(s) derived from another vinyl monomer(s), from the viewpoint of the balance between the fluidity of the transparent thermoplastic resin composition and the impact resistance of the molded article. The content of the rubbery polymer (r) is more preferably 15% by mass or more and 20% by mass or less.

The content of the structural unit(s) derived from the (meth)acrylic acid ester monomer, the content of the structural unit(s) derived from the aromatic vinyl monomer and the content of the structural unit(s) derived from the vinyl cyanide monomer, with respect to 100% by mass of the total amount of the structural unit(s) derived from the (meth) acrylic acid ester monomer, the structural unit(s) derived from the aromatic vinyl monomer, the structural unit(s) derived from the vinyl cyanide monomer and the structural unit(s) derived from another vinyl monomer(s), in the acetone-soluble component contained in the transparent thermoplastic resin composition, can be obtained by the following method.

Specifically, the transparent thermoplastic resin composition is introduced into acetone to dissolve the soluble component, and the filtrate obtained by filtering the acetone-insoluble component from the transparent thermoplastic resin composition is concentrated and dried by a rotatory evaporator, to collect the acetone-soluble component. The thus obtained acetone-soluble component is formed into a film having a thickness of 30±5 μm by heat pressing, with the temperature set to 230° C., and the film is subjected to an FT-IR analysis. The content of the structural unit(s) derived from each monomer can be quantified, based on the calibration curve prepared in advance from the intensity ratio of the following peaks appearing in the resulting FT-IR spectrum chart. The relationship between the structural unit derived from each monomer and the corresponding peak is described below.

The structural unit derived from the (meth)acrylic acid ester monomer: the peak at 3460 $cm^{-1}$, which is an overtone peak of the peak at 1730 $cm^{-1}$ attributed to the C=O stretching vibration of the carbonyl group of the ester.

The structural unit derived from the aromatic vinyl monomer: the peak at 1605 $cm^{-1}$ attributed to the vibration of the benzene nucleus.

The structural unit derived from the vinyl cyanide monomer: the peak at 2240 $cm^{-1}$ attributed to the C≡N stretching.

Further, the content of the rubbery polymer (r) with respect to 100% by mass of the total amount of the rubbery polymer (r), the structural unit(s) derived from the (meth) acrylic acid ester monomer, the structural unit(s) derived from the aromatic vinyl monomer, the structural unit(s) derived from the vinyl cyanide monomer and the structural unit(s) derived from another vinyl monomer(s), can be quantified as follows. Specifically, the transparent thermoplastic resin composition is formed into a film having a thickness of 30±5 μm by heat pressing, with the temperature set to 230° C., and the film is subjected to an FT-IR analysis. The content of the rubbery polymer (r) can be quantified, based on the calibration curve prepared in advance from the intensity ratio of peaks of the structural units derived from the respective monomers and of the rubbery polymer (r), which appear in the resulting FT-IR spectrum chart. The relationship between the rubbery polymer (r) and the corresponding peak is described below.

The rubbery polymer (r): the peak at 960 $cm^{-1}$ attributed to C=C.

In the transparent thermoplastic resin composition, when the weight average molecular weight of the acetone-soluble component contained in the transparent thermoplastic resin composition is defined as Mw1, and the content (% by mass) of the structural unit(s) derived from the vinyl cyanide monomer contained in the acetone-soluble component with respect to 100% by mass of the mass of the acetone-soluble component is defined as W1, the value obtained by dividing Mw1 by W1 is preferably 11,000 or more. For example, when the weight average molecular weight of the acetone-soluble component contained in the transparent thermoplastic resin composition is 500,000, and the content of the structural unit(s) derived from the vinyl cyanide monomer contained in the acetone-soluble component with respect to 100% by mass of the mass of the acetone-soluble component is 5%, the value obtained by dividing Mw1 by W1 is 100,000. When the value obtained by dividing Mw1 by W1 is less than 11,000, there are instances where the effect of improving the impact resistance by the structural unit(s) derived from the vinyl cyanide monomer included in the vinyl copolymer (B) becomes insufficient, possibly resulting in a decrease in the impact resistance of the molded article, thus is not preferred.

The transparent thermoplastic resin composition contains an ester compound (C) and an ester compound (D) in addition to the graft copolymer (A) and the vinyl copolymer (B).

The ester compound (C) is a hydrogenated product of a triglyceride of an acid(s) selected from the group consisting of palmitic acid, stearic acid, oleic acid, linoleic acid, ricinoleic acid and dihydroxystearic acid, and 85% by mass or more of the acid(s) constituting the triglyceride is a hydrogenated product of ricinoleic acid, that is, 12-hydroxystearic acid.

Therefore, the main component of the ester compound (C) is an ester obtained from 12-hydroxystearic acid and glycerol.

A compound synthesized by the esterification of the above-described acid(s) with glycerol may be used as the ester compound (C). However, since a naturally-derived hydrogenated castor oil is known as such a compound, it is economically advantageous to obtain the transparent thermoplastic resin composition using hydrogenated castor oil.

When hydrogenated castor oil is used as the ester compound (C), the hydrogenated castor oil preferably has an iodine value of 5 or less, and more preferably 3 or less from the viewpoint of improving the color of the resulting molded article, but not particularly limited thereto. When the iodine value of the hydrogenated castor oil is 5 or less, discoloration due to thermal degradation during processing can be reduced. The iodine value is measured in accordance with JIS K0070:1992.

The content of the ester compound (C) is preferably 0.4 to 2.0 parts by mass, and more preferably 0.4 to 0.8 parts by mass, with respect to 100 parts by mass of the total amount of the graft copolymer (A) and the vinyl copolymer (B). When the content of the ester compound (C) is 0.4 parts by mass or more with respect to 100 parts by mass of the total amount of the graft copolymer (A) and the vinyl copolymer (B), it is possible to improve the impact resistance of the molded article and the fluidity of the transparent thermoplastic resin composition. Further, when the content of the ester compound (C) is 2.0 parts by mass or less with respect to 100 parts by mass of the total amount of the graft copolymer (A) and the vinyl copolymer (B), it is possible to improve the impact resistance of the molded article without compromising the transparency of the molded article, and further, to improve the fluidity of the transparent thermoplastic resin composition. In particular, when the content of the ester compound (C) is 0.4 to 0.8 parts by mass with respect to 100 parts by mass of the total amount of the graft copolymer (A) and the vinyl copolymer (B), it is possible not only to improve the impact resistance of the molded article, the fluidity of the transparent thermoplastic resin composition and mold releasability during molding, but also to decrease the amount of gas generated during molding and to further reduce mold fouling.

The ester compound (D) is an ester of an acid(s) selected from the group consisting of palmitic acid, stearic acid, oleic acid, linoleic acid, ricinoleic acid and dihydroxystearic acid, with a polyhydric alcohol (with the proviso that the ester contains at least one ester bond with an unsaturated carboxylic acid), and 85% by mass or more of the acid(s) constituting the ester is ricinoleic acid.

The polyhydric alcohol refers to a compound containing two or more hydroxyl groups within one molecule. The polyhydric alcohol is not particularly limited as long as it is a compound containing two or more hydroxyl groups. However, a dihydric to hexahydric alcohol having 2 to 30 carbon atoms is preferably used.

Examples of the dihydric alcohol, of the dihydric to hexahydric alcohol described above, include ethylene glycol, propylene glycol, 1,3-propanediol, 1,4-butanediol, 1,5-pentanediol, 1,6-hexandiol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexanedimethanol, spiroglycol, 1,4-phenylene glycol, bisphenol A and hydrogenated bisphenol A. Examples of the trihydric alcohol include 1,2,4-butanetriol, 1,2,5-pentanetriol, 2-methyl-1,2,4-butanetriol, glycerol, 2-methylpropanetriol, trimethylolethane, triethylolethane, trimethylolpropane and 1,3,5-trihydroxymethylbenzene. Examples of the tetrahydric alcohol include 1,2,3,6-hexanetetrol and pentaerythritol; examples of the pentahydric alcohol include glucose; and examples of the hexahydric alcohol include dipentaerythritol.

A compound synthesized by the esterification of the above-described acid(s) with a polyhydric alcohol may be used as the ester compound (D). However, it is economically advantageous to obtain the compound (D) from a natural fat or oil, or a processed product of a natural fat or oil. In particular, it is easy to use a modified compound (castor oil-based polyester polyol) obtained using castor oil, which is one kind of vegetable oil obtained by extracting oil from the seeds of the castor-oil plant (scientific name: *Ricinus communis* L.), or a derivative thereof, as a starting material. The composition of castor oil fatty acids included in castor oil is known to be composed of 87 to 91% of ricinoleic acid, 4 to 5% of linoleic acid, 2.5 to 4% of oleic acid, 0.5 to 1.5% of palmitic acid, 0.5 to 1.5% of stearic acid, 0.5 to 1.5% of linolenic acid and 0.5 to 1.5% of dihydroxystearic acid.

When a castor oil-based polyester polyol is used as the ester compound (D), examples thereof include polyester polyols produced using castor oil or castor oil fatty acids. Examples of the castor oil-based polyester polyol further include transesterification products of castor oil with other natural fats and oils, reaction products of castor oil with polyhydric alcohols, and esterification reaction products of castor oil fatty acids with polyhydric alcohols. These polyester polyols may be used singly, or as a mixture of two or more kinds thereof.

As the ester compound (D), it is preferred to use one having a hydroxyl value of 170 mg KOH/g or more, more preferably 200 mg KOH/g or more. The use of the ester compound (D) having a hydroxyl value of 170 mg KOH/g or more enables to improve the fluidity of the transparent thermoplastic resin composition while further improving the transparency of the molded article. The upper limit of the hydroxyl value is preferably 350 mg KOH/g or less.

Further, the ester compound (D) preferably has an acid value of 15 mg KOH/g or less. The acid value of the ester compound (D) is more preferably 10 mg KOH/g or less, still more preferably 8 mg KOH/g or less, and particularly preferably 2 mg KOH/g or less. When the acid value is 15 mg KOH/g or less, the ester compound (D) has a high heat resistance, and it is possible to improve the color of the molded article, in addition to reducing the amount of gas generated during molding from unreacted residual fatty acids, which are low-molecular-weight components, and reducing mold fouling.

The acid value and the hydroxyl value are measured in accordance with JIS K0070: 1992.

Moreover, the ester compound (D) preferably has a viscosity at 25° C. of 200 to 1,500 mPa·s, more preferably 200 to 750 mPa·s, and still more preferably 200 to 500 mPa·s. When the above-described viscosity is 200 m Pa·s or more, it is possible to reduce the amount of gas generated during molding from the ester compound (D), and to reduce mold fouling. Further, when the above-described viscosity is 1,500 mPa·s or less, the fluidity of the transparent thermoplastic resin composition can further be improved. The value of the viscosity is measured in accordance with JIS Z8803: 2011.

When using castor oil, or a castor oil-based polyester polyol as the ester compound (D), the castor oil or the castor oil-based polyester polyol may be produced in accordance with a known production method, or a commercially available product thereof may be used. Examples of the commercially available product of the castor oil or the castor oil-based polyester polyol include URIC H series (H-30, H-31, H-52, H-57, H-62, H-73X, H-81, H-854, H-870, H-1823, H-1824 and HF-1300), URIC Y series (Y-403 and Y-406), URIC AC series (AC-005, AC-006 and AC-009), URIC PH series (PH-5001) and URIC F series (F-40, F-60 and F-97), all manufactured by Itoh Oil Chemicals Co., Ltd. Among these, H-30, H-62 or H-73X is preferably used from the viewpoint of the transparency and the impact resistance of the molded article, and the fluidity of the transparent thermoplastic resin composition.

The content of the ester compound (D) in the transparent thermoplastic resin composition is preferably 0.4 to 3.0 parts by mass, and more preferably 0.6 to 2.4 parts by mass, with respect to 100 parts by mass of the total amount of the graft copolymer (A) and the vinyl copolymer (B). The upper limit of the content is still more preferably 1.5 parts by mass or less. When the content of the ester compound (D) is 0.4 parts by mass or more with respect to 100 parts by mass of the total amount of the graft copolymer (A) and the vinyl copolymer (B), it is possible to improve the fluidity of the transparent thermoplastic resin composition, and to improve the mold releasability of the molded article. Further, when the content of the ester compound (D) is 3.0 parts by mass or less with respect to 100 parts by mass of the total amount of the graft copolymer (A) and the vinyl copolymer (B), the fluidity of the transparent thermoplastic resin composition can further be improved without compromising the transparency and the impact resistance of the molded article. In particular, when the content of the ester compound (D) is 0.6 to 2.4 parts by mass with respect to 100 parts by mass of the total amount of the graft copolymer (A) and the vinyl copolymer (B), it is possible not only to improve the impact resistance of the molded article, the fluidity of the transparent thermoplastic resin composition and mold releasability during molding, but also to decrease the amount of gas generated during molding and to reduce mold fouling.

Since the ester compound (C) greatly contributes particularly to an improvement in the impact resistance of the molded article, the compound is thought to be present unevenly distributed around the rubbery polymer (r), in the transparent thermoplastic resin composition. As a result, it becomes possible to decrease the elastic modulus around the rubbery polymer (r) to mitigate a drastic difference in elastic modulus that occurs between the rubber phase and the matrix phase, and to mitigate the concentration of stress at the interface. In addition, the presence of the ester compound (C) unevenly distributed around the rubbery polymer (r) enables to improve the slip characteristics of the rubbery polymer (r) against impact, and to enhance the impact absorption capacity of the rubbery polymer (r). On the other hand, an excessive incorporation of the ester compound (C) is not preferred because the effect of improving the impact resistance of the molded article levels off, possibly leading to a decrease in the mold releasability and an increase in the amount of gas generated during molding, and causing mold fouling. Since the ester compound (D) greatly contributes particularly to an improvement in the fluidity of the transparent thermoplastic resin composition, the compound is thought to be well dispersed in the matrix phase of the transparent thermoplastic resin composition. In addition, the ester compound (D) maintains transparency. On the other hand, an excessive incorporation of the ester compound (D) is not preferred because it may lead to a decrease in the impact resistance of the molded article and an increase in the amount of gas generated during molding, and may cause mold fouling.

Based on the reasons described above, the transparent thermoplastic resin composition preferably contains the ester compound (C) and the ester compound (D) in a mass ratio of 25:75 to 40:60, from the viewpoint of improving the impact resistance of the molded article, the fluidity of the transparent thermoplastic resin composition and mold releasability during molding, and decreasing the amount of gas generated during molding. When the amount of the ester compound (D) is more than 75% by mass, and the amount of the ester compound (C) is less than 25% by mass, the impact resistance of the molded article may not be sufficiently obtained, thus is not preferred. On the other hand, when the amount of the ester compound (D) is less than 60% by mass, and the amount of the ester compound (C) is more than 40% by mass, the fluidity of the transparent thermoplastic resin composition may not be sufficiently obtained, possibly resulting in a decrease in the mold releasability, thus is not preferred.

The transparent thermoplastic resin composition may contain a carboxylic acid ester of a polyhydric alcohol which does not correspond either to the ester compound (C) or the ester compound (D), as long as the desired effect is not impaired.

The transparent thermoplastic resin composition may further contain a polydimethylsiloxane gum (E). The polydimethylsiloxane gum (E) refers to a polydimethylsiloxane which is in the form of a gum and has a weight average molecular weight of 300,000 or more. A polydimethylsiloxane having a weight average molecular weight of 300,000 or more is in the form of a gum, not a liquid. The value of the weight average molecular weight of the polydimethylsiloxane gum (E) is measured in the same manner as that described for the acetone-soluble component of the graft copolymer (A), or for the vinyl copolymer (B), but calculated in terms of polystyrene as a reference material.

The content of the polydimethylsiloxane gum (E) is not particularly limited. From the viewpoint of further improving the impact resistance without compromising the transparency and the mold releasability, however, the content of the polydimethylsiloxane gum (E) is preferably 15 to 100 ppm (that is, $15 \times 10^{-6}$ to $100 \times 10^{-6}$ parts by mass), and more preferably 30 to 80 ppm with respect to 100 parts by mass of the total amount of the graft copolymer (A) and the vinyl copolymer (B).

The transparent thermoplastic resin composition may further contain any of various kinds of antioxidants.

Examples of phenolic antioxidants include: reaction products of p-cresol dicyclopentadiene isobutylene; 2,4,5- and 2,4,6-3 phenols such as 2,2'-methylenebis(4-methyl-6-t-butylphenol), 2,6-di-t-butyl-4-methylphenol, triethylene glycol-bis-[3-(3-t-butyl-5-methyl-4-hydroxyphenyl)propionate], pentaerythritol tetrakis[3-(3,5-di-t-butyl-4-hydroxyphenyl)propionate], n-octadecyl-3-(3,5-di-t-butyl-4-hydroxyphenyl)propionate, 1,3,5-trimethyl-2,4,6-tris(3,5-di-t-butyl-4-hydroxybenzyl)benzene, 2-t-butyl-6-(3-t-butyl-2-hydroxy-5-methylbenzyl)-4-methylphenyl acrylate, 2-[1-(2-hydroxy-3,5-di-t-pentylphenyl)]-4,6-di-t-pentylphenyl acrylate (548.9, one), 3,9-bis[2-{3-(t-butyl-4-hydroxy-5-methylphenyl) propyloxy}-1,1-dimethylethyl]-2,4,8,10-tetraoxa[5,5]undecane, 1,3,5-tris(3',5')-di-t-butyl-4'-hydroxybenzyl-s-triazine-2,4,6(1H,2H,3H)-trione, 1,1,4-tris(2-methyl-4-hydroxy-5-t-butylphenyl)butane, and 4,4'-butylidenebis(3-methyl-6-t-butylphenol); and reaction products of p-cresol dicyclopentadiene isobutylene.

Examples of phosphorus-based antioxidants include pentaerythritol-type diphosphite compounds such as tris(2,4-di-t-butylphenyl) phosphite, distearyl pentaerythritol diphosphite, bis(2,4-di-t-butylphenyl)-pentaerythritol diphosphite, bis(2,6-di-t-butyl-4-methylphenyl)-pentaerythritol diphosphite, 2,2-methylenebis(4,6-di-t-butylphenyl) octyl phosphite and dinonylphenyl pentaerythritol diphosphite.

Examples of sulfur-based antioxidants include distearyl 3,3'-thiodipropionate, dimyristyl-3,3'-thiodipropionate, dilauryl thiodipropionate, lauryl stearyl thiodipropionate and pentaerythritol tetrakis(3-laurylthiopropionate).

If necessary, the transparent thermoplastic resin composition can further contain any of the following, to the extent that the desired effect is not impaired: inorganic fillers such as glass fibers, glass powders, glass beads, glass flakes, alumina, alumina fibers, carbon fibers, graphite fibers, stainless steel fibers, whiskers, potassium titanate fibers, wollastonite, asbestos, hard clay, calcined clay, talc, kaolin, mica, calcium carbonate, magnesium carbonate, aluminum oxide and minerals; thermal stabilizers such as hindered phenolic stabilizers and acrylate-based stabilizers; ultraviolet absorbers such as benzotriazole-based, benzophenone-based and salicylate-based ultraviolet absorbers; hindered amine light stabilizers; lubricants and plasticizers such as higher fatty acids, acid esters, acid amide compounds and higher alcohols; mold release agents such as montanic acid, salts thereof, esters thereof and half esters thereof, stearyl alcohol, stearamide and ethylene wax; various types of flame retardants; auxiliary flame retardants; coloration inhibitors such as phosphites and hypophosphites; neutralizers such as phosphoric acid, monosodium phosphate, maleic anhydride and succinic anhydride; nucleating agents; antistatic agents such as amine-based, sulfonic acid-based, polyether-based antistatic agents; and colorants such as carbon black, pigments and dyes.

Being "transparent" means that a rectangular-plate-shaped molded article (length: 50 mm, width: 40 mm, thickness: 3 mm) has a total light transmittance as measured using a direct reading haze meter manufactured by Toyo Seiki Co., Ltd, of 80% or more.

In one example of the transparent thermoplastic resin composition, it is possible to obtain a transparent thermoplastic resin composition wherein a rectangular plate-shaped molded article (length: 50 mm, width: 40 mm, thickness: 3 mm) thereof has a total light transmittance of 87% or more and a haze of 3 or less, as indices of transparency, and a Charpy impact strength of 14 kJ/m$^2$ or more, as an index of impact resistance, and wherein the resin composition has an MFR (220° C., 98N) of 20 g/10 min or more, as an index of fluidity, and has a good mass productivity. Further, when the content of the ester compound (C) is adjusted to 0.4 to 0.8 parts by mass with respect to 100 parts by mass of the total amount of the graft copolymer (A) and the vinyl copolymer (B), the content of the ester compound (D) is adjusted to 0.8 to 2.4 parts by mass with respect to 100 parts by mass of the total amount of the graft copolymer (A) and the vinyl copolymer (B), the mass ratio of the ester compound (C) and the ester compound (D) is adjusted to 25:75 to 40:60, and the ester compound (D) whose hydroxyl value is 170 to 350 mg KOH/g is used, it is possible to easily obtain a transparent thermoplastic resin composition in which the total light transmittance is 88% or more, the haze is 2 or less, the Charpy impact strength is 15 kJ/m$^2$ or more, the MFR (220° C., 98N) is 22 g/10 min or more, and the number of white mark (including ejector mark), when filled at a pressure of the lower limit pressure during molding+60 MPa, is 8 or less, and which has a good mass productivity.

Method of Producing Transparent Thermoplastic Resin Composition

Next, the method of producing the transparent thermoplastic resin composition will be described. The transparent thermoplastic resin composition can be obtained, for example, by mixing the above-described graft copolymer (A), vinyl copolymer (B), ester compound (C) and ester compound (D), and another component(s) such as the above-described polydimethylsiloxane gum (E) if necessary, followed by melt kneading. A method is more preferred in which the vinyl copolymer (B) is produced by continuous bulk polymerization, and further, the graft copolymer (A), the ester compound (C), the ester compound (D) and another component(s) such as the polydimethylsiloxane gum (E) if necessary, are continuously melt-kneaded therewith. By continuously performing the production of the vinyl copolymer (B) to the production of the transparent thermoplastic resin composition, which is the final product, the thermal history can be reduced to improve the color of the transparent thermoplastic resin composition.

FIG. 1 shows a schematic diagram of one example of an apparatus to produce the transparent thermoplastic resin composition, which is preferably used. The apparatus to produce the transparent thermoplastic resin composition shown in FIG. 1 includes: a complete-mixing type polymerization tank 1 that produces the vinyl copolymer (B); a single-screw extruder type preheater 2 for heating the resulting vinyl copolymer (B) to a predetermined temperature; and a twin-screw extruder type demonomerization device 3; and these are connected in this order. Further, a twin-screw extruder type feeder 5 for supplying the graft copolymer (A), the ester compound (C), the ester compound (D) and another component(s) such as the polydimethylsiloxane gum (E) if necessary, by side feeding, is connected to the twin-screw extruder type demonomerization device 3. The complete-mixing type polymerization tank 1 includes a stirrer (helical ribbon blade) 7, and the twin-screw extruder type demonomerization device 3 includes a vent port 8 for removing volatile components such as unreacted monomers.

The reaction product (vinyl copolymer (B)) continuously supplied from the complete-mixing type polymerization tank 1 is heated to a predetermined temperature in the single-screw extruder type preheater 2, and then supplied to the twin-screw extruder type demonomerization device 3. In the twin-screw extruder type demonomerization device 3, volatile components such as unreacted monomers are removed out of the system from the vent port 8, generally at a temperature of about 150 to 280° C. under normal pressure or reduced pressure. In general, the removal of the volatile components is performed until the amount of the volatile components is reduced to a predetermined amount such as, for example, 10% by mass or less, more preferably 5% by mass or less. Further, the removed volatile components are preferably supplied to the complete-mixing type polymerization tank 1 again.

The graft copolymer (A), the ester compound (C), and the polydimethylsiloxane gum (E) if necessary, are supplied from the twin-screw extruder type feeder 5, through an opening provided in the twin-screw extruder type demonomerization device 3 at a position closer to the downstream side thereof. Further, the ester compound (D) is supplied to the twin-screw extruder type feeder 5 using a liquid-additive addition pump, via a liquid-additive addition nozzle 11 located at a position corresponding to ⅔ with respect to the total length of the twin-screw extruder type feeder 5 from the downstream side end (the position at which the twin-screw extruder type feeder 5 is connected to the twin-screw extruder type demonomerization device 3) thereof. The twin-screw extruder type feeder 5 preferably includes a heating device. The mixing state can be improved by supplying the graft copolymer (A) to the twin-screw extruder type demonomerization device 3 in a melted or half-melted state. The graft copolymer (A) is usually heated at a heating temperature of 100 to 220° C. The twin-screw extruder type feeder 5 may be, for example, a twin-screw extruder type feeder which is composed of a screw, a cylinder and a screw driving unit, and in which the cylinder has heating and cooling functions.

At the position of the twin-screw extruder type demonomerization device 3 at which the twin-screw extruder type feeder 5 is connected, the content of the unreacted monomers is preferably decreased to 10% by mass or less, more preferably to 5% by mass or less, to reduce the thermal degradation of the rubber component due to the subsequent operation for removing unreacted monomers.

The vinyl copolymer (B), the graft copolymer (A), the ester compound (C), the ester compound (D), and the polydimethylsiloxane gum (E) if necessary, are melt-kneaded within a melt kneading region 4, which is a region downstream of the position of the twin-screw extruder type demonomerization device 3 at which the twin-screw extruder type feeder 5 is connected, and the resulting transparent thermoplastic resin composition is discharged out of the system from a discharge port 6. It is preferred to provide a water injection port 9 to the melt kneading region 4, and to add a predetermined amount of water therethrough. The injected water and volatile components such as unreacted monomers are removed out of the system from a final vent port 10 provided further downstream.

Since the polydimethylsiloxane gum (E) is added in a small amount, it is preferred to prepare a resin-diluted product of the polydimethylsiloxane gum in advance, in accordance with the method disclosed in WO 2021/014736, and to add the polydimethylsiloxane gum (E), as the resin-diluted product of the polydimethylsiloxane gum in which the content of the polydimethylsiloxane gum (E) is about 10% by mass.

The transparent thermoplastic resin composition can be molded by an arbitrary molding method. Examples of the molding method include injection molding, extrusion molding, inflation molding, blow molding, vacuum molding, compression molding and gas assisted molding. Among these, injection molding is preferably used. Injection molding is carried out preferably at a cylinder temperature of 210 to 320° C., and preferably at a mold temperature of 30 to 80° C.

The transparent thermoplastic resin composition can be widely used as a molded article of an arbitrary shape. Examples of the molded article include films, sheets, fibers, fabrics, nonwoven fabrics, injection molded articles, extrusion molded articles, vacuum pressure molded articles, blow molded articles, and composites with other materials.

The transparent thermoplastic resin composition is useful in applications such as consumer electronics, communication-related equipment, general merchandise and medical equipment since the composition can have both an excellent impact resistance and fluidity while maintaining a particularly high degree of transparency and good color.

EXAMPLES

Figure 2:
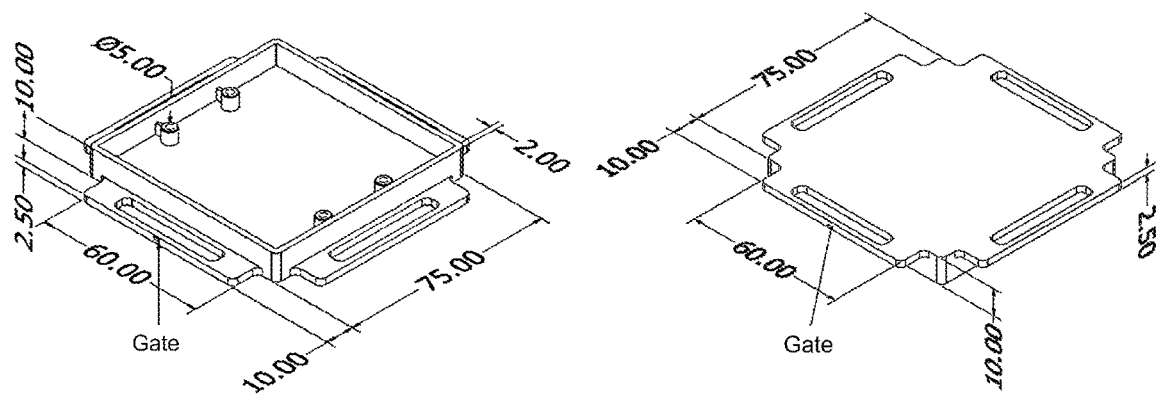
FIG. 2 is a diagram illustrating a molded article used for the evaluation of mold releasability, and the evaluation method.

Our compositions, articles and methods will now be described in further detail with reference to Examples. However, this disclosure is not construed as being limited to these Examples. First, evaluation methods will be described.
Evaluation Methods for Transparent Thermoplastic Resin Composition
(1) Transparency (Haze)
Sample pellets of the resin composition were dried in a hot air dryer at 80° C. for 3 hours, then filled into a molding machine, SE-50DU, manufactured by Sumitomo Heavy Industries, Ltd., which had been set to a cylinder temperature of 230° C., and immediately formed into a rectangular-plate-shaped molded article having a thickness of 3 mm. Using a direct reading haze meter manufactured by Toyo Seiki Co., Ltd., the haze (%) was measured for each of five pieces of the resulting rectangular-plate-shaped molded articles by a method in accordance with ISO 14782, and the mean value of the measured values was calculated.
(2) Transparency (Total Light Transmittance)
Sample pellets of the resin composition were dried in a hot air dryer at 80° C. for 3 hours, then filled into a molding machine, SE-50DU, manufactured by Sumitomo Heavy Industries, Ltd., which had been set to a cylinder temperature of 230° C., and immediately formed into a rectangular-plate-shaped molded article having a thickness of 3 mm. Using a direct reading haze meter manufactured by Toyo Seiki Co., Ltd., the total light transmittance (%) was measured for each of five pieces of the resulting rectangular-plate-shaped molded articles by a method in accordance with ISO 13468, and the mean value of the measured values was calculated.
(3) Impact Resistance (Charpy Impact Strength)
Sample pellets of the resin composition were dried in a hot air dryer at 80° C. for 3 hours, then filled into a molding machine, SE-50DU, manufactured by Sumitomo Heavy Industries, Ltd., which had been set to a cylinder temperature of 230° C., and immediately formed into a dumbbell test piece having a thickness 4 mm. The Charpy impact strength was measured for each of five pieces of the resulting dumbbell test pieces by a method in accordance with ISO 179, and the mean value of the measured values was calculated.
(4) Fluidity (Melt Flow Rate (MFR))
Sample pellets of the resin composition were dried in a hot air dryer at 80° C. for 3 hours, and then the MFR was measured under the conditions of a measurement temperature of 220° C. and a load of 98 N, by a method in accordance with ISO1133.
(5) Mold Releasability
Sample pellets of the resin composition were dried in a hot air dryer at 80° C. for 3 hours, and then filled into a molding machine, PS60, manufactured by Nissei Plastic Industrial Co., Ltd., which had been set to a cylinder temperature of 230° C., a mold temperature of 60° C. and a cooling time of 20 seconds. The mode of the molding machine was switched to pressure control mode at the gate position, to determine the lower limit pressure that allows for filling the resin into the shape of the molded article shown in FIG. 2. Subsequently, the number of white mark (including ejector mark) was counted by visual observation for each of five pieces of molded articles molded under the condition of a lower limit pressure+60 MPa, and the mean value thereof was calculated.
(6) Mass Productivity
The production of the pellets of the resin composition was performed for 2 hours, according to the procedure described in each of the Examples and Comparative Examples, and then the screen mesh (#150 mesh) used was observed to confirm the presence or absence of a gelled product (clogged substance) on the mesh.
Good: No gelled product (clogged substance) was observed.
Poor: Some gelled product (clogged substance) was observed.

Production of Transparent Thermoplastic Resin Composition

Production Example 1 Graft Copolymer (A)

Graft copolymer (A-1): Into a reaction vessel equipped with a stirring blade and having a capacity of 25 m³, 50 parts by mass (in terms of solid content) of a polybutadiene latex (mass average particle size of rubber: 0.30 μm, refractive index: 1.516), 130 parts by mass of pure water, 0.4 parts by mass of sodium laurate, 0.2 parts by mass of glucose, 0.2 parts by mass of sodium pyrophosphate and 0.01 parts by mass of ferrous sulfate were introduced. After replacing the air in the vessel with nitrogen, the temperature was controlled to 60° C., and a monomer mixture composed of 3.4 parts by mass of styrene, 1.4 parts by mass of acrylonitrile, 10.2 parts by mass of methyl methacrylate and 0.12 parts by mass of t-dodecyl mercaptan was added with stirring, as an initial addition, over 45 minutes.

Subsequently, an initiator mixture composed of 0.3 parts by mass of cumene hydroperoxide, 1.6 parts by mass of sodium laurate as an emulsifying agent, and 25 parts by mass of pure water, was added dropwise continuously over 5 hours. Simultaneously, a monomer mixture composed of 2.8 parts by mass of styrene, 0.6 parts by mass of acrylonitrile, 8.3 parts by mass of methyl methacrylate and 0.13 parts by mass of t-dodecyl mercaptan was additionally added dropwise continuously over one hour. Thereafter, a monomer mixture composed of 5.8 parts by mass of styrene, 17.5 parts by mass of methyl methacrylate and 0.27 parts by mass of t-dodecyl mercaptan was additionally added dropwise continuously over 2 hours. After the dropwise additions of the monomer mixture, the polymerization was maintained while continuously adding the initiator mixture alone for 2 hours and adding nothing thereafter for the following 1 hour, and then the polymerization was terminated. After the completion of the polymerization, an emulsified dispersion of a reaction product of p-cresol dicyclopentadiene isobutylene was added thereto in an amount of 0.4 parts by mass, in terms of solid content of the reaction product of p-cresol dicyclopentadiene isobutylene, with respect to 100 parts by mass of the graft copolymer (A-1). The resulting latex of the graft copolymer was allowed to coagulate with 1.5% by mass sulfuric acid, then neutralized with sodium hydroxide, followed by washing, centrifugation and drying, to obtain the graft copolymer (A-1) (the ratio of monomer-derived structural units are structural units derived from styrene of 24% by mass, structural units derived from acrylonitrile of 4% by mass and structural units derived from methyl methacrylate of 72% by mass) in the form of a powder, which had been mixed with the reaction product of p-cresol dicyclopentadiene isobutylene. The refractive index of the acetone-insoluble component of the resulting graft copolymer (A-1) was 1.516, and the difference in refractive index with that of the rubbery polymer (r) was 0.000. The graft ratio of the graft copolymer was 47%. Further, the weight average molecular weight of the acetone-soluble component was 72,000.

Production Example 2 Vinyl Copolymer (B)

Vinyl Copolymer (B-1'): The production of a styrene/acrylonitrile/methyl methacrylate copolymer was carried out by the same method as described in Example 1, except that the respective materials were supplied from the complete-mixing type polymerization tank, without supplying from the twin-screw extruder type feeder as in Example 1, to obtain the styrene/acrylonitrile/methyl methacrylate copolymer (the ratio of monomer-derived structural units=structural units derived from styrene: 22.9% by mass; structural units derived from acrylonitrile: 10% by mass; structural units derived from methyl methacrylate: 67.1% by mass). The refractive index of the resulting styrene/acrylonitrile/methyl methacrylate copolymer was 1.516, and the difference in refractive index with that of the rubbery polymer (r) was 0.000. Further, the weight average molecular weight of the copolymer was 110,000.

Vinyl Copolymer (B-2'): The production of a styrene/acrylonitrile/methyl methacrylate copolymer was carried out by the same method as described in Example 23, except that the respective materials were supplied from the complete-mixing type polymerization tank, without supplying from the twin-screw extruder type feeder as in Example 23, to obtain the styrene/acrylonitrile/methyl methacrylate copolymer (the ratio of monomer-derived structural units=structural units derived from styrene: 22.9% by mass; structural units derived from acrylonitrile: 10% by mass; structural units derived from methyl methacrylate: 67.1% by mass). The refractive index of the resulting styrene/acrylonitrile/methyl methacrylate copolymer was 1.516, and the difference in refractive index with that of the rubbery polymer (r) was 0.000. Further, the weight average molecular weight of the copolymer was 98,500.

Vinyl Copolymer (B-3'): The production of a styrene/acrylonitrile/methyl methacrylate copolymer was carried out by the same method as described in Example 24, except that the respective materials were supplied from the complete-mixing type polymerization tank, without supplying from the twin-screw extruder type feeder as in Example 24, to obtain the styrene/acrylonitrile/methyl methacrylate copolymer (the ratio of monomer-derived structural units=structural units derived from styrene: 22.4% by mass; structural units derived from acrylonitrile: 12.6% by mass; structural units derived from methyl methacrylate: 65% by mass). The refractive index of the resulting styrene/acrylonitrile/methyl methacrylate copolymer was 1.516, and the difference in refractive index with that of the rubbery polymer (r) was 0.000. Further, the weight average molecular weight of the copolymer was 116,000.

Vinyl Copolymer (B-4'): The production of a styrene/acrylonitrile/methyl methacrylate copolymer was carried out by the same method as described in Example 25, except that the respective materials were supplied from the complete-mixing type polymerization tank, without supplying from the twin-screw extruder type feeder as in Example 25, to obtain the styrene/acrylonitrile/methyl methacrylate copolymer (the ratio of monomer-derived structural units=structural units derived from styrene: 23.4% by mass; structural units derived from acrylonitrile: 7% by mass; structural units derived from methyl methacrylate: 69.6% by mass). The refractive index of the resulting styrene/acrylonitrile/methyl methacrylate copolymer was 1.516, and the difference in refractive index with that of the rubbery polymer (r) was 0.000. Further, the weight average molecular weight of the copolymer was 110,000.

Production Example 3 Ester Compound (C)

Ester compound (C-1): hydrogenated castor oil, manufactured by Itoh Oil Chemicals Co., Ltd. (iodine value: 5 or less)

Production Example 4 Ester Compound (D)

Ester compound (D-1): castor oil, URIC H-30, manufactured by Itoh Oil Chemicals Co., Ltd. (hydroxyl value: 155 to 165 mg KOH/g, viscosity: 660 to 720 m Pa·s/25° C.)

Ester compound (D-2): a castor oil-based polyester polyol, URIC H-62, manufactured by Itoh Oil Chemicals Co., Ltd. (hydroxyl value: 245 to 275 mg KOH/g, viscosity: 240 to 290 m Pa·s/25° C.)

Ester compound (D-3): a castor oil-based polyester polyol, URIC H-73X, manufactured by Itoh Oil Chemicals Co., Ltd. (hydroxyl value: 260 to 280 mg KOH/g, viscosity: 800 to 1200 m Pa·s/25° C.) Production Example 5 Compound Other Than Ester Compound (C) and Ester Compound (D)

Other Compound (F)

Other compound (F-1): glycerol monostearate, RIKEMAL S-100, manufactured by Riken Vitamin Co., Ltd.

Other compound (F-2): glycerol mono/distearate, RIKEMAL S-200, manufactured by Riken Vitamin Co., Ltd.

Other compound (F-3): glycerol mono-12-hydroxystearate, RIKEMAL HC-100, manufactured by Riken Vitamin Co., Ltd.

Other compound (F-4): a polyol ester, LOXIOL G24, manufactured by Emery Oleochemicals (hydroxyl value: 30 mg KOH/g or less)

Other compound (F-5): a partial fatty acid ester of a polyol, LOXIOL VPA1726, manufactured by Emery Oleochemicals (hydroxyl value: 430 to 500 mg KOH/g, viscosity: 600 to 800 m Pa·s/25° C.)

Other compound (F-6): a partial fatty acid ester of glycerol, LOXIOL P1141, manufactured by Emery Oleochemicals (viscosity: 60 to 110 m Pa·s/25° C.)

Other compound (F-7): pentaerythritol monostearate, EXCEPAL PE-MS, manufactured by Kao Corporation Production Example 6 Polydimethylsiloxane (E)

E-1: GENIOPLAST GUM, manufactured by Wacker Asahikasei silicone Co., Ltd.
Preparation of Resin Diluted Product of Polydimethylsiloxane Gum (E-1)

Into a double arm pressure kneader (Model: DS55-100MWH-H) manufactured by Moriyama Manufacturing Co., Ltd., 30 kg (60 parts by mass) of the graft copolymer (A-1), 15 kg (30 parts by mass) of the vinyl copolymer (B-1') and 5 kg (10 parts by mass) of the polydimethylsiloxane gum (E-1) were introduced. The mixture was mixed at a stirring speed of 60 rpm for 5 minutes under a pressure of 1 MPa, and then the pressure was released, followed by mixing for 3 minutes at normal pressure. Thereafter, the mixture was mixed with stirring again under a pressure of 1 MPa for 5 minutes, to obtain a resin diluted product (E-1') of the polydimethylsiloxane gum in which the polydimethylsiloxane gum (E-1) had been adhered on the surface of the solids of the graft copolymer (A-1) and the vinyl copolymer (B-1'). The processing temperature was 58° C. or lower.

Specific Examples and Comparative Examples will be described below.

In each of Examples and Comparative Examples, the production of a thermoplastic resin composition was carried out using a continuous bulk polymerization apparatus which has a basic structure as shown in FIG. 1. This continuous bulk polymerization apparatus includes: the complete-mixing type polymerization tank 1 having a capacity of 2 m³ and equipped with a condenser (not shown) for evaporation and dry distillation of monomer vapor and a helical ribbon blade; the single-screw extruder type preheater 2; the twin-screw extruder type demonomerization device 3; and the twin-screw extruder type feeder 5 connected, for side feeding, to the barrel portion of the demonomerization device at a position corresponding to ⅓ in the longitudinal direction from the downstream (outlet) side end of the device. Specific details thereof are as will be described in the respective Examples and Comparative Examples. The vinyl copolymer (B) was produced in the system (In the Tables, the vinyl copolymer (B) produced in each of Examples 1 to 22 and Example 26 as well as Comparative Examples 1 to 10 is indicated as "vinyl copolymer (B-1)", the vinyl copolymer (B) produced in Example 23 is indicated as "vinyl copolymer (B-2)", the vinyl copolymer (B) produced in Example 24 is indicated as "vinyl copolymer (B-3)", and the vinyl copolymer (B) produced in Example 24 is indicated as "vinyl copolymer (B-4)").

Example 1

A monomer mixture (b) composed of 22.9 parts by mass of styrene, 10 parts by mass of acrylonitrile, 67.1 parts by mass of methyl methacrylate, 0.21 parts by mass of n-octyl mercaptan and 0.015 parts by mass of 1,1-bis(t-butylperoxy)cyclohexane was continuously supplied to the complete-mixing type polymerization tank at a rate of 150 kg/hour, and continuous bulk polymerization was carried out while maintaining a polymerization temperature of 130° C. and an in-tank pressure of 0.08 MPa. The polymerization rate of the polymerization reaction mixture at the outlet of the complete-mixing type polymerization tank was controlled to 70±5%.

Subsequently, the polymerization reaction mixture was preheated by the single-screw extruder type preheater, then supplied to the twin-screw extruder type demonomerization device, and unreacted monomers were collected by reduced pressure evaporation from the vent port of the twin-screw extruder type demonomerization device. The collected unreacted monomers were continuously refluxed to the complete-mixing type polymerization tank. At a position corresponding to ⅓ with respect to the total length of the twin-screw extruder type demonomerization device from the downstream side end thereof, 2,2'-methylenebis(4-methyl-6-t-butylphenol) which is a phenolic stabilizer was supplied at 0.132 kg/hour, distearyl 3,3'-thiodipropionate which is a sulfur-based stabilizer was supplied at 0.288 kg/hour, the ester compound (C-1) was supplied at 0.484 kg/hour (0.2 parts by mass) and a half-melted product of the graft copolymer (A-1) was supplied at 91.9 kg/hour (38 parts by mass), from the twin-screw extruder type feeder, to 150 kg/hours (62 parts by mass) of the above-described styrene/acrylonitrile/methyl methacrylate copolymer whose apparent polymerization rate had reached 99% or more. Further, the ester compound (D-2) was supplied at 0.968 kg/hour (0.4 parts by mass) to the twin-screw extruder type feeder using a liquid addition pump, via the liquid-additive addition nozzle located at a position corresponding to ⅔ with respect to the total length of the twin-screw extruder type feeder from the downstream side end (the position at which the twin-screw extruder type feeder is connected to the twin-screw extruder type demonomerization device) thereof, and melt-kneaded with the styrene/acrylonitrile/methyl methacrylate copolymer in the twin-screw extruder type demonomerization device. During the above-described melt-kneading step, water was supplied at 2 kg/hour, at a position corresponding to ⅙ with respect to the total length of the twin-screw extruder type demonomerization device from the downstream side end thereof. The water and other volatile components were removed by reduced pressure evaporation, from the vent port provided further downstream in the twin-screw extruder type demonomerization device. Thereafter, the melt-kneaded product was discharged in the form of strands, and cut with a cutter to obtain pellets of a transparent thermoplastic resin composition.

Example 2

Pellets of a transparent thermoplastic resin composition were obtained in the same manner as in Example 1, except that the feed rate of the ester compound (D-2) was changed to 1.935 kg/hour (0.8 parts by mass).

Example 3

Pellets of a transparent thermoplastic resin composition were obtained in the same manner as in Example 1, except that the feed rate of the ester compound (D-2) was changed to 2.903 kg/hour (1.2 parts by mass).

Example 4

Pellets of a transparent thermoplastic resin composition were obtained in the same manner as in Example 1, except that the feed rate of the ester compound (D-2) was changed to 4.838 kg/hour (2 parts by mass).

Example 5

Pellets of a transparent thermoplastic resin composition were obtained in the same manner as in Example 1, except that the feed rate of the ester compound (D-2) was changed to 6.289 kg/hour (2.6 parts by mass).

Example 6

Pellets of a transparent thermoplastic resin composition were obtained in the same manner as in Example 1, except that the feed rate of the ester compound (C-1) was changed to 1.210 kg/hour (0.5 parts by mass).

Example 7

Pellets of a transparent thermoplastic resin composition were obtained in the same manner as in Example 1, except that the feed rate of the ester compound (C-1) was changed to 1.210 kg/hour (0.5 parts by mass), and the feed rate of the ester compound (D-2) was changed to 1.935 kg/hour (0.8 parts by mass).

Example 8

Pellets of a transparent thermoplastic resin composition were obtained in the same manner as in Example 1, except that the feed rate of the ester compound (C-1) was changed to 1.210 kg/hour (0.5 parts by mass), and the feed rate of the ester compound (D-2) was changed to 2.903 kg/hour (1.2 parts by mass).

Example 9

Pellets of a transparent thermoplastic resin composition were obtained in the same manner as in Example 1, except that the feed rate of the ester compound (C-1) was changed to 1.210 kg/hour (0.5 parts by mass), and the feed rate of the ester compound (D-2) was changed to 4.838 kg/hour (2 parts by mass).

Example 10

Pellets of a transparent thermoplastic resin composition were obtained in the same manner as in Example 1, except that the feed rate of the ester compound (C-1) was changed to 1.210 kg/hour (0.5 parts by mass), and the feed rate of the ester compound (D-2) was changed to 6.289 kg/hour (2.6 parts by mass).

Example 11

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 0.968 kg/hour (0.4 parts by mass).

Example 12

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 1.935 kg/hour (0.8 parts by mass).

Example 13

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 2.903 kg/hour (1.2 parts by mass).

Example 14

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 4.838 kg/hour (2 parts by mass).

Example 15

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 6.289 kg/hour (2.6 parts by mass).

Example 16

Pellets of a transparent thermoplastic resin composition were obtained in the same manner as in Example 1, except that the feed rate of the ester compound (C-1) was changed to 2.903 kg/hour (1.2 parts by mass), and the feed rate of the ester compound (D-2) was changed to 0.968 kg/hour (0.4 parts by mass).

Example 17

Pellets of a transparent thermoplastic resin composition were obtained in the same manner as in Example 1, except that the feed rate of the ester compound (C-1) was changed to 2.903 kg/hour (1.2 parts by mass), and the feed rate of the ester compound (D-2) was changed to 1.935 kg/hour (0.8 parts by mass).

Example 18

Pellets of a transparent thermoplastic resin composition were obtained in the same manner as in Example 1, except that the feed rate of the ester compound (C-1) was changed to 2.903 kg/hour (1.2 parts by mass), and the feed rate of the ester compound (D-2) was changed to 2.903 kg/hour (1.2 parts by mass).

Example 19

Pellets of a transparent thermoplastic resin composition were obtained in the same manner as in Example 1, except that the feed rate of the ester compound (C-1) was changed to 2.903 kg/hour (1.2 parts by mass), and the feed rate of the ester compound (D-2) was changed to 4.838 kg/hour (2 parts by mass).

Example 20

Pellets of a transparent thermoplastic resin composition were obtained in the same manner as in Example 1, except that the feed rate of the ester compound (C-1) was changed to 2.903 kg/hour (1.2 parts by mass), and the feed rate of the ester compound (D-2) was changed to 6.289 kg/hour (2.6 parts by mass).

Example 21

Pellets of a transparent thermoplastic resin composition were obtained in the same manner as in Example 1, except that the feed rate of the ester compound (C-1) was changed to 1.693 kg/hour (0.7 parts by mass), the ester compound (D-1) was used instead of the ester compound (D-2), and the feed rate thereof was set to 2.903 kg/hour (1.2 parts by mass).

Example 22

Pellets of a transparent thermoplastic resin composition were obtained in the same manner as in Example 1, except that the feed rate of the ester compound (C-1) was changed to 1.693 kg/hour (0.7 parts by mass), the ester compound (D-3) was used instead of the ester compound (D-2), and the feed rate thereof was set to 2.903 kg/hour (1.2 parts by mass).

Example 23

Pellets of a transparent thermoplastic resin composition were obtained in the same manner as in Example 1, except that the composition of the monomer mixture (b) was changed to 22.9 parts by mass of styrene, 10 parts by mass of acrylonitrile, 67.1 parts by mass of methyl methacrylate, 0.265 parts by mass of n-octyl mercaptan and 0.015 parts by mass of 1,1-bis(t-butylperoxy)cyclohexane, and that the feed rate of the ester compound (C-1) was changed to 1.693 kg/hour (0.7 parts by mass), and the feed rate of the ester compound (D-2) was changed to 2.903 kg/hour (1.2 parts by mass).

Example 24

Pellets of a transparent thermoplastic resin composition were obtained in the same manner as in Example 1, except that the composition of the monomer mixture (b) was changed to 22.4 parts by mass of styrene, 12.6 parts by mass of acrylonitrile, 65 parts by mass of methyl methacrylate, 0.235 parts by mass of n-octyl mercaptan and 0.015 parts by mass of 1,1-bis(t-butylperoxy)cyclohexane, and that the feed rate of the ester compound (C-1) was changed to 1.693 kg/hour (0.7 parts by mass), and the feed rate of the ester compound (D-2) was changed to 2.903 kg/hour (1.2 parts by mass).

Example 25

Pellets of a transparent thermoplastic resin composition were obtained in the same manner as in Example 1, except that the composition of the monomer mixture (b) was changed to 23.4 parts by mass of styrene, 7 parts by mass of acrylonitrile, 69.6 parts by mass of methyl methacrylate, 0.225 parts by mass of n-octyl mercaptan and 0.015 parts by mass of 1,1-bis(t-butylperoxy)cyclohexane, and that the feed rate of the ester compound (C-1) was changed to 1.693 kg/hour (0.7 parts by mass), and the feed rate of the ester compound (D-2) was changed to 2.903 kg/hour (1.2 parts by mass).

Example 26

Pellets of a transparent thermoplastic resin composition were obtained in the same manner as in Example 1, except that the feed rate of the ester compound (C-1) was changed to 1.693 kg/hour (0.7 parts by mass), and the feed rate of the ester compound (D-2) was changed to 2.903 kg/hour (1.2 parts by mass), and that the resin diluted product (E-1') of the polydimethylsiloxane gum was further supplied, and the feed rate thereof was set to 0.145 kg/hour (0.06 parts by mass).

Comparative Example 1

Pellets of a transparent thermoplastic resin composition were obtained in the same manner as in Example 1, except that the ester compound (C-1) was not supplied, and the feed rate of the ester compound (D-2) was changed to 2.903 kg/hour (1.2 parts by mass).

Comparative Example 2

Pellets of a transparent thermoplastic resin composition were obtained in the same manner as in Example 1, except that the feed rate of the ester compound (C-1) was changed to 1.693 kg/hour (0.7 parts by mass), and the ester compound (D-2) was not supplied.

Comparative Example 3

Pellets of a transparent thermoplastic resin composition were obtained in the same manner as in Example 1, except that the ester compound (C-1) was not supplied, and the ester compound (D-2) was not supplied.

Comparative Example 4

Pellets of a transparent thermoplastic resin composition were obtained in the same manner as in Example 1, except that the ester compound (D-2) was not supplied, the other compound (F-1) was newly supplied, and the feed rate thereof was set to 2.903 kg/hour (1.2 parts by mass).

Comparative Example 5

Pellets of a transparent thermoplastic resin composition were obtained in the same manner as in Example 1, except that the ester compound (D-2) was not supplied, the other compound (F-2) was newly supplied, and the feed rate thereof was set to 2.903 kg/hour (1.2 parts by mass).

Comparative Example 6

Pellets of a transparent thermoplastic resin composition were obtained in the same manner as in Example 1, except that the ester compound (D-2) was not supplied, the other compound (F-3) was newly supplied, and the feed rate thereof was set to 2.903 kg/hour (1.2 parts by mass).

Comparative Example 7

Pellets of a transparent thermoplastic resin composition were obtained in the same manner as in Example 1, except that the ester compound (D-2) was not supplied, the other compound (F-4) was newly supplied, and the feed rate thereof was set to 2.903 kg/hour (1.2 parts by mass).

Comparative Example 8

Pellets of a transparent thermoplastic resin composition were obtained in the same manner as in Example 1, except that the ester compound (D-2) was not supplied, the other compound (F-5) was newly supplied, and the feed rate thereof was set to 2.903 kg/hour (1.2 parts by mass).

Comparative Example 9

Pellets of a transparent thermoplastic resin composition were obtained in the same manner as in Example 1, except that the ester compound (D-2) was not supplied, the other compound (F-6) was newly supplied, and the feed rate thereof was set to 2.903 kg/hour (1.2 parts by mass).

Comparative Example 10

Pellets of a transparent thermoplastic resin composition were obtained in the same manner as in Example 1, except that the ester compound (D-2) was not supplied, the other compound (F-7) was newly supplied, and the feed rate thereof was set to 2.903 kg/hour (1.2 parts by mass).

The results are summarized in Tables 1 to 4.

TABLE 1

| | | | Example 1 | Example 2 | Example 3 | Example 4 | Example 5 | Example 6 |
|---|---|---|---|---|---|---|---|---|
| Graft copolymer (A) | | Type | A-1 | A-1 | A-1 | A-1 | A-1 | A-1 |
| | | parts by mass | 38 | 38 | 38 | 38 | 38 | 38 |
| Vinyl copolymer (B) | | Type | B-1 | B-1 | B-1 | B-1 | B-1 | B-1 |
| | | parts by mass | 62 | 62 | 62 | 62 | 62 | 62 |
| Ester compound (C) | | Type | C-1 | C-1 | C-1 | C-1 | C-1 | C-1 |
| | | parts by mass | 0.2 | 0.2 | 0.2 | 0.2 | 0.2 | 0.5 |
| Ester compound (D) | | Type | D-2 | D-2 | D-2 | D-2 | D-2 | D-2 |
| | | parts by mass | 0.4 | 0.8 | 1.2 | 2 | 2.6 | 0.4 |
| Ester compound (C)/Ester compound (D) | | — | 33/67 | 20/80 | 14/86 | 9/91 | 7/93 | 56/44 |
| Mw1 | | — | 105000 | 105000 | 105000 | 105000 | 105000 | 105000 |
| W1 | | — | 9.2 | 9.2 | 9.2 | 9.2 | 9.2 | 9.2 |
| Mw1/W1 | | — | 11413 | 11413 | 11413 | 11413 | 11413 | 11413 |
| Impact resistance | Charpy impact value | kJ/m$^2$ | 14.3 | 14.1 | 14.1 | 14.0 | 13.8 | 15.5 |
| Fluidity | MFR | g/10 min | 20.1 | 22.3 | 24.3 | 28.4 | 32.5 | 20.4 |
| Transparency | HAZE | % | 2 | 2 | 2 | 2 | 2 | 2 |
| | Total light transmittance | % | 88.6 | 88.5 | 88.4 | 88.3 | 87.7 | 88.3 |
| Mold releasability | Number of white marks | Number | 7 | 5 | 4 | 4 | 4 | 10 |
| Mass productivity | Gelled product | — | Good | Good | Good | Good | Good | Good |

| | | | Example 7 | Example 8 | Example 9 | Example 10 |
|---|---|---|---|---|---|---|
| Graft copolymer (A) | | Type | A-1 | A-1 | A-1 | A-1 |
| | | parts by mass | 38 | 38 | 38 | 38 |
| Vinyl copolymer (B) | | Type | B-1 | B-1 | B-1 | B-1 |
| | | parts by mass | 62 | 62 | 62 | 52 |
| Ester compound (C) | | Type | C-1 | C-1 | C-1 | C-1 |
| | | parts by mass | 0.5 | 0.5 | 0.5 | 0.5 |
| Ester compound (D) | | Type | D-2 | D-2 | D-2 | D-2 |
| | | parts by mass | 0.8 | 1.2 | 2 | 2.6 |
| Ester compound (C)/Ester compound (D) | | — | 38/62 | 29/71 | 20/80 | 16/84 |
| Mw1 | | — | 105000 | 105000 | 105000 | 105000 |
| W1 | | — | 9.2 | 9.2 | 9.2 | 9.2 |
| Mw1/W1 | | — | 11413 | 11413 | 11413 | 11413 |
| Impact resistance | Charpy impact value | kJ/m$^2$ | 15.4 | 15.4 | 14.9 | 14.6 |
| Fluidity | MFR | g/10 min | 22.3 | 24.7 | 28.7 | 32.7 |
| Transparency | HAZE | % | 2 | 2 | 2 | 2 |
| | Total light transmittance | % | 88.2 | 88.1 | 88.0 | 87.4 |
| Mold releasability | Number of white marks | Number | 8 | 7 | 5 | 5 |
| Mass productivity | Gelled product | — | Good | Good | Good | Good |

TABLE 2

|  |  | Example 11 | Example 12 | Example 13 | Example 14 | Example 15 |
|---|---|---|---|---|---|---|
| Graft copolymer (A) | Type | A-1 | A-1 | A-1 | A-1 | A-1 |
|  | parts by mass | 38 | 38 | 38 | 38 | 38 |
| Vinyl copolymer (B) | Type | B-1 | B-1 | B-1 | B-1 | B-1 |
|  | parts by mass | 62 | 62 | 62 | 62 | 62 |
| Ester compound (C) | Type | C-1 | C-1 | C-1 | C-1 | C-1 |
|  | parts by mass | 0.7 | 0.7 | 0.7 | 0.7 | 0.7 |
| Ester compound (D) | Type | D-2 | D-2 | D-2 | D-2 | D-2 |
|  | parts by mass | 0.4 | 0.8 | 1.2 | 2 | 2.6 |
| Ester compound (C)/Ester compound (D) | — | 64/36 | 47/53 | 37/63 | 26/74 | 21/79 |
| Mw1 | — | 105000 | 105000 | 105000 | 105000 | 105000 |
| W1 | — | 9.2 | 9.2 | 9.2 | 9.2 | 9.2 |
| Mw1/W1 | — | 11413 | 11413 | 11413 | 11413 | 11413 |
| Impact resistance Charpy impact value | kJ/m² | 15.7 | 15.6 | 15.6 | 15.4 | 14.8 |
| Fluidity MFR | g/10 min | 20.5 | 22.8 | 25.0 | 29.0 | 33.0 |
| Transparency HAZE | % | 2 | 2 | 2 | 2 | 2 |
| Total light transmittance | % | 88.3 | 88.2 | 88.1 | 88.0 | 87.4 |
| Mold releasability Number of white marks | Number | 10 | 10 | 8 | 6 | 6 |
| Mass productivity Gelled product | — | Good | Good | Good | Good | Good |

|  |  | Example 16 | Example 17 | Example 18 | Example 19 | Example 20 |
|---|---|---|---|---|---|---|
| Graft copolymer (A) | Type | A-1 | A-1 | A-1 | A-1 | A-1 |
|  | parts by mass | 38 | 38 | 38 | 38 | 38 |
| Vinyl copolymer (B) | Type | B-1 | B-1 | B-1 | B-1 | B-1 |
|  | parts by mass | 62 | 62 | 62 | 62 | 62 |
| Ester compound (C) | Type | C-1 | C-1 | C-1 | C-1 | C-1 |
|  | parts by mass | 1.2 | 1.2 | 1.2 | 1.2 | 1.2 |
| Ester compound (D) | Type | D-2 | D-2 | D-2 | D-2 | D-2 |
|  | parts by mass | 0.4 | 0.8 | 1.2 | 2 | 2.6 |
| Ester compound (C)/Ester compound (D) | — | 75/25 | 60/40 | 50/50 | 38/62 | 32/68 |
| Mw1 | — | 105000 | 105000 | 105000 | 105000 | 105000 |
| W1 | — | 9.2 | 9.2 | 9.2 | 9.2 | 9.2 |
| Mw1/W1 | — | 11413 | 11413 | 11413 | 11413 | 11413 |
| Impact resistance Charpy impact value | kJ/m² | 15.7 | 15.6 | 15.6 | 15.4 | 14.8 |
| Fluidity MFR | g/10 min | 21.6 | 23.9 | 26.1 | 29.9 | 34.0 |
| Transparency HAZE | % | 3 | 3 | 3 | 3 | 3 |
| Total light transmittance | % | 87.9 | 87.8 | 87.7 | 87.6 | 87.2 |
| Mold releasability Number of white marks | Number | 18 | 16 | 15 | 12 | 12 |
| Mass productivity Gelled product | — | Good | Good | Good | Good | Good |

TABLE 3

|  |  | Example 21 | Example 22 | Example 23 | Example 24 | Example 25 | Example 26 |
|---|---|---|---|---|---|---|---|
| Graft copolymer (A) | Type | A-1 | A-1 | A-1 | A-1 | A-1 | A-1 |
|  | parts by mass | 38 | 38 | 38 | 38 | 38 | 38 |
| Vinyl copolymer (B) | Type | B-1 | B-1 | B-2 | B-3 | B-4 | B-1 |
|  | parts by mass | 62 | 62 | 62 | 62 | 62 | 62 |
| Ester compound (C) | Type | C-1 | C-1 | C-1 | C-1 | C-1 | C-1 |
|  | parts by mass | 0.7 | 0.7 | 0.7 | 0.7 | 0.7 | 0.7 |
| Ester compound (D) | Type | D-1 | D-3 | D-2 | D-2 | D-2 | D-2 |
|  | parts by mass | 1.2 | 1.2 | 1.2 | 1.2 | 1.2 | 1.2 |
| Ester compound (C)/Ester compound (D) | — | 37/63 | 37/63 | 37/63 | 37/63 | 37/63 | 37/63 |
| Resin diluted product (E-1') of polydimethylsiloxane gum | parts by mass | — | — | — | — | — | 0.06 |
| Mw1 | — | 105000 | 105000 | 95,000 | 115000 | 105000 | 105000 |
| W1 | — | 9.2 | 9.2 | 9.2 | 11.5 | 7 | 9.2 |
| Mw1/W1 | — | 11413 | 11413 | 10326 | 10000 | 15000 | 11413 |
| Impact resistance Charpy impact value | kJ/m² | 15.4 | 15.4 | 14.2 | 15.7 | 14.0 | 17.3 |
| Fluidity MFR | g/10 min | 24.1 | 23.5 | 26.0 | 21.9 | 25.7 | 24.8 |

TABLE 3-continued

|  |  |  | Example 21 | Example 22 | Example 23 | Example 24 | Example 25 | Example 26 |
|---|---|---|---|---|---|---|---|---|
| Transparency | HAZE | % | 3 | 2 | 2 | 2 | 2 | 3 |
|  | Total light transmittance | % | 88 | 88.1 | 88.1 | 88.1 | 88.1 | 87.5 |
| Mold releasability | Number of white marks | Number | 8 | 8 | 8 | 8 | 8 | 10 |
| Mass productivity | Gelled product | — | Good | Good | Good | Good | Good | Good |

TABLE 4

|  |  | Comparative Example 1 | Comparative Example 2 | Comparative Example 3 | Comparative Example 4 | Comparative Example 5 |
|---|---|---|---|---|---|---|
| Graft copolymer (A) | Type | A-1 | A-1 | A-1 | A-1 | A-1 |
|  | parts by mass | 38 | 38 | 38 | 38 | 38 |
| Vinyl copolymer (B) | Type | B-1 | B-1 | B-1 | B-1 | B-1 |
|  | parts by mass | 62 | 62 | 62 | 62 | 62 |
| Ester compound (C) | Type | C-1 | C-1 | C-1 | C-1 | C-1 |
|  | parts by mass | 0 | 0.7 | 0 | 0.7 | 0.7 |
| Ester compound (D) | Type | D-2 | D-2 | D-2 | F-1 | — |
|  | parts by mass | 1.2 | 0 | 0 | — | — |
| Ester compound (C)/Ester compound (D) | — | —/— | —/— | —/— | —/— | —/— |
| Other Compound (F) | Type | — | — | — | F-1 | F-2 |
|  | parts by mass | — | — | — | 1.2 | 1.2 |
| Mw1 | — | 105000 | 105000 | 105000 | 105000 | 105000 |
| W1 | — | 9.2 | 9.2 | 9.2 | 9.2 | 9.2 |
| Mw1/W1 | — | 11413 | 11413 | 11413 | 11413 | 11413 |
| Impact resistance | Charpy impact value | kJ/m$^2$ | 13.0 | 15.7 | 13.0 | 15.7 | 15.9 |
| Fluidity | MFR | g/10 min | 24.0 | 18.2 | 17.6 | 25.4 | 24.8 |
| Transparency | HAZE | % | 2 | 2 | 2 | 2 | 3 |
|  | Total light transmittance | % | 88.8 | 88.5 | 88.9 | 88 | 87 |
| Mold releasability | Number of white marks | Number | 4 | 11 | 4 | 8 | 7 |
| Mass productivity | Gelled product | — | Good | Good | Good | Poor | Poor |

|  |  | Comparative Example 6 | Comparative Example 7 | Comparative Example 8 | Comparative Example 9 | Comparative Example 10 |
|---|---|---|---|---|---|---|
| Graft copolymer (A) | Type | A-1 | A-1 | A-1 | A-1 | A-1 |
|  | parts by mass | 38 | 38 | 38 | 38 | 38 |
| Vinyl copolymer (B) | Type | B-1 | B-1 | B-1 | B-1 | B-1 |
|  | parts by mass | 62 | 62 | 62 | 62 | 62 |
| Ester compound (C) | Type | C-1 | C-1 | C-1 | C-1 | C-1 |
|  | parts by mass | 0.7 | 0.7 | 0.7 | 0.7 | 0.7 |
| Ester compound (D) | Type | — | — | — | — | — |
|  | parts by mass | — | — | — | — | — |
| Ester compound (C)/Ester compound (D) | — | —/— | —/— | —/— | —/— | —/— |
| Other Compound (F) | Type | F-3 | F-4 | F-5 | F-6 | F-7 |
|  | parts by mass | 1.2 | 1.2 | 1.2 | 1.2 | 1.2 |
| Mw1 | — | 105000 | 105000 | 105000 | 105000 | 105000 |
| W1 | — | 9.2 | 9.2 | 9.2 | 9.2 | 9.2 |
| Mw1/W1 | — | 11413 | 11413 | 11413 | 11413 | 11413 |
| Impact resistance | Charpy impact value | kJ/m$^2$ | 15.8 | 15.8 | 15.9 | 15.6 | 15.6 |
| Fluidity | MFR | g/10 min | 25.6 | 22.5 | 25.2 | 23.5 | 23.5 |
| Transparency | HAZE | % | 2 | 6 | 3 | 3 | 4 |
|  | Total light transmittance | % | 88.1 | 84 | 87.2 | 87 | 86.8 |
| Mold releasability | Number of white marks | Number | 8 | 10 | 8 | 8 | 8 |
| Mass productivity | Gelled product | — | Poor | Poor | Poor | Poor | Poor |

As shown in the evaluation results of Examples 1 to 26, our transparent thermoplastic resin compositions have both an excellent impact resistance and fluidity while maintaining a particularly high degree of transparency.

Further, as shown in Examples 7, 8, 13, 14 and 22, the transparent thermoplastic resin compositions of these Examples were particularly excellent in the balance between the transparency, the impact resistance, the fluidity, the mold releasability and the mass productivity, by adjusting the content of the ester compound (C) to 0.4 to 0.8 parts by mass with respect to 100 parts by mass of the total amount of the graft copolymer (A) and the vinyl copolymer (B), adjusting the content of the ester compound (D) to 0.8 to 2.4 parts by mass with respect to 100 parts by mass of the total amount of the graft copolymer (A) and the vinyl copolymer (B), adjusting the mass ratio of the ester compound (C) and the ester compound (D) to 25:75 to 40:60, and using the ester compound (D) having a hydroxyl value of 170 to 350 mg KOH/g.

The transparent thermoplastic resin composition of Comparative Example 1 showed poor impact resistance, due to not adding the ester compound (C). The transparent thermoplastic resin composition of Comparative Example 2 showed poor fluidity and mold releasability, due to not adding the ester compound (D). The transparent thermoplastic resin composition of Comparative Example 3 showed poor impact resistance and fluidity, due to not adding the ester compound (C) and the ester compound (D). Comparative Examples 4 to 10 are examples in which the ester compound (C) and the ester compound (D) were not used in combination, and a compound different from these compounds, that is, the other compound (F) was used. The generation of a large amount of gel was observed in these Comparative Examples, indicating poor mass productivity.

INDUSTRIAL APPLICABILITY

Our transparent thermoplastic resin compositions and molded articles can be widely used in applications such as consumer electronics, communication-related equipment, general merchandise and medical equipment.

The invention claimed is:

1. A transparent thermoplastic resin composition, comprising:
    a graft copolymer (A) obtained by graft-copolymerizing a monomer mixture (a) that contains an aromatic vinyl monomer (a1) and a (meth)acrylic acid ester monomer (a2), in the presence of a rubbery polymer (r);
    a vinyl copolymer (B) obtained by copolymerizing a monomer mixture (b) that contains an aromatic vinyl monomer (b1), a (meth)acrylic acid ester monomer (b2) and a vinyl cyanide monomer (b3);
    an ester compound (C); and
    an ester compound (D);
    wherein said ester compound (C) is a hydrogenated product of a triglyceride of an acid(s) selected from the group consisting of palmitic acid, stearic acid, oleic acid, linoleic acid, ricinoleic acid and dihydroxystearic acid, and 85% by mass or more of said acid(s) constituting said triglyceride is a hydrogenated product of ricinoleinic acid; and
    said ester compound (D) is an ester of an acid(s) selected from the group consisting of palmitic acid, stearic acid, oleic acid, linoleic acid, ricinoleic acid and dihydroxystearic acid, with a polyhydric alcohol with the proviso that said ester contains at least one ester bond with an unsaturated carboxylic acid, and 85% by mass or more of said acid(s) constituting said ester is ricinoleic acid, wherein content of said ester compound (C) is 0.4 to 0.8 parts by weight mass with respect to 100 parts by mass of the total amount of said graft copolymer (A) and said vinyl copolymer (B); content of said ester compound (D) is 0.6 to 2.4 parts by mass with respect to 100 parts by mass of the total amount of said graft copolymer (A) and said vinyl copolymer (B); and a mass ratio ((C):(D)) of said ester compound (C) to said ester compound (D) is 25:75 to 40:60.

2. The transparent thermoplastic resin composition according to claim 1, wherein said ester compound (D) has a hydroxyl value of 170 to 350 mg KOH/g.

3. The transparent thermoplastic resin composition according to claim 1, wherein an acetone-soluble component contained in said transparent thermoplastic resin composition has a weight average molecular weight of 100,000 to 120,000.

4. The transparent thermoplastic resin composition according to claim 1, wherein, in an acetone-soluble component contained in said transparent thermoplastic resin composition, content of a structural unit(s) derived from said (meth)acrylic acid ester monomers (a2 or b2) is 50 to 82% by mass, content of a structural unit(s) derived from said aromatic vinyl monomers (a1 or b1) is 10 to 30% by mass, and content of a structural unit(s) derived form said vinyl cyanide monomer (b3) is 8 to 15% by mass, with respect to 100% by mass of the total amount of said structural unit(s) derived from said (meth)acrylic acid ester monomers (a2 or b2), said structural unit(s) derived from said aromatic vinyl monomers (a1 or b1), said structural unit(s) derived from said vinyl cyanide monomer (b3) and a structural unit(s) derived from another vinyl monomer(s).

5. The transparent thermoplastic resin composition according to claim 1, wherein, when weight average molecular weight of an acetone-soluble component contained in said transparent thermoplastic resin composition is defined as Mw1, and content, (% by mass), of said structural unit(s) derived from said vinyl cyanide monomer (b3) contained in said acetone-soluble component with respect to 100% by mass of the mass of said acetone-soluble component is defined as W1, the value obtained by dividing Mw1 by W1 is 11,000 or more.

6. The transparent thermoplastic resin composition according to claim 1, wherein said transparent thermoplastic resin composition further comprises a polydimethylsiloxane gum (E).

7. A method of producing a transparent thermoplastic resin composition, the method comprising:
    obtaining a graft copolymer (A) by graft-copolymerizing a monomer mixture (a) that contains an aromatic vinyl monomer and a (meth)acrylic acid ester monomer (a2), in the presence of a rubbery polymer (r);
    obtaining a vinyl copolymer (B) by copolymerizing a monomer mixture (b) that contains an aromatic vinyl monomer (b1), a (meth)acrylic acid ester monomer (b2) and a vinyl cyanide monomer (b3); and
    mixing said graft copolymer (A), said vinyl copolymer (B), an ester compound (C) and an ester compound (D),
    wherein said ester compound (C) is a hydrogenated product of a triglyceride of an acid(s) selected from the group consisting of palmitic acid, stearic acid, oleic acid, linoleic acid, ricinoleic acid and dihydroxystearic acid, and 85% by mass or more of said acid(s) constituting said triglyceride is a hydrogenated product of ricinoleinic acid; and
    said ester compound (D) is an ester of an acid(s) selected from the group consisting of palmitic acid, stearic acid, oleic acid, linoleic acid, ricinoleic acid and dihydroxystearic acid, with a polyhydric alcohol with the proviso that said ester contains at least one ester bond with an unsaturated carboxylic acid, and 85% by mass or more of said acid(s) constituting said ester is ricinoleic acid, wherein the content of said ester compound (C) is 0.4 to 0.8 parts by weight mass with respect to 100 parts by mass of the total amount of said graft copolymer (A) and said vinyl copolymer (B); content of said ester compound (D) is 0.6 to 2.4 parts by mass with respect to 100 parts by mass of the total amount of said graft copolymer (A) and said vinyl copolymer (B); and a mass ratio ((C):(D)) of said ester compound (C) to said ester compound (D) is 2.5:75 to 40:60.

8. A molded article comprising the transparent thermoplastic resin composition according to claim 1.

9. A molded article comprising a transparent thermoplastic resin composition produced by the method according to claim 7.

* * * * *